US011946351B2

(12) United States Patent
Nielsen et al.

(10) Patent No.: US 11,946,351 B2
(45) Date of Patent: Apr. 2, 2024

(54) SYSTEMS AND METHODS FOR CONTROLLING ELECTROMAGNETIC HEATING OF A HYDROCARBON MEDIUM

(71) Applicant: Acceleware Ltd., Calgary (CA)

(72) Inventors: Jorgen S. Nielsen, Calgary (CA); Michal M. Okoniewski, Calgary (CA)

(73) Assignee: Acceleware Ltd., Calgary (CA)

( * ) Notice: Subject to any disclaimer, the term of this patent is extended or adjusted under 35 U.S.C. 154(b) by 0 days.

(21) Appl. No.: 17/917,475

(22) PCT Filed: Apr. 6, 2021

(86) PCT No.: PCT/CA2021/050456
§ 371 (c)(1),
(2) Date: Oct. 6, 2022

(87) PCT Pub. No.: WO2021/212210
PCT Pub. Date: Oct. 28, 2021

(65) Prior Publication Data

US 2023/0160288 A1 May 25, 2023

Related U.S. Application Data

(60) Provisional application No. 63/015,057, filed on Apr. 24, 2020.

(51) Int. Cl.
*E21B 43/24* (2006.01)
*H05B 6/06* (2006.01)

(52) U.S. Cl.
CPC ........... *E21B 43/2401* (2013.01); *H05B 6/06* (2013.01)

(58) Field of Classification Search
CPC .............................. E21B 43/2401; H05B 6/06
See application file for complete search history.

(56) References Cited

U.S. PATENT DOCUMENTS

| | | | |
|---|---|---|---|
| 2,757,738 | A | 8/1956 | Ritchey |
| 3,169,577 | A | 2/1965 | Sarapuu |

(Continued)

FOREIGN PATENT DOCUMENTS

| | | | |
|---|---|---|---|
| CA | 2816101 | A1 | 5/2012 |
| CA | 2816297 | A1 | 5/2012 |

(Continued)

OTHER PUBLICATIONS

"Available power", International Electrotechnical Commission, 1992 <http://www.electropedia.org/iev/iev.nsf/display?oppenform&ievref=702-07-10>. (2 pages).

(Continued)

*Primary Examiner* — Taras P Bemko
(74) *Attorney, Agent, or Firm* — BERESKIN & PARR LLP/S.E.N.C.R.L. s.r.l; Isis E. Caulder; Maria Wei

(57) ABSTRACT

Systems and methods for controlling heating of a hydrocarbon medium using a signal generator and a load having frequency and time dependent impedance. A desired heating life cycle is determined. A current state is determined using a model of the medium and the load. A desired operational state is determined from the current operational state and the desired heating life cycle. The desired operational state is selected to maximize a fit between the desired operational state and the desired heating life cycle. Desired signal generator control settings are determined for the signal generator in order to achieve the desired operational state. An output signal is generated using the signal generator by applying the at least one desired signal generator control setting to the signal generator. The output signal is defined to excite the load and thereby heat the hydrocarbon medium.

21 Claims, 14 Drawing Sheets

(56) References Cited

U.S. PATENT DOCUMENTS

| | | | |
|---|---|---|---|
| 3,170,519 | A | 2/1965 | Haagensen |
| 3,522,848 | A | 8/1970 | New |
| 4,135,579 | A | 1/1979 | Rowland et al. |
| 4,140,179 | A | 2/1979 | Kasevich et al. |
| 4,140,180 | A | 2/1979 | Bridges et al. |
| 4,144,935 | A | 3/1979 | Bridges et al. |
| 4,193,451 | A | 3/1980 | Dauphine |
| 4,301,865 | A | 11/1981 | Kasevich et al. |
| 4,319,632 | A | 3/1982 | Marr, Jr. |
| 4,320,801 | A | 3/1982 | Rowland et al. |
| 4,449,585 | A | 5/1984 | Bridges et al. |
| 4,470,459 | A | 9/1984 | Copland |
| 4,487,257 | A | 12/1984 | Dauphine |
| 4,508,168 | A | 4/1985 | Heeren |
| 4,513,815 | A | 4/1985 | Rundell et al. |
| 4,583,589 | A | 4/1986 | Kasevich |
| 4,620,593 | A | 11/1986 | Haagensen |
| 5,099,918 | A | 3/1992 | Bridges et al. |
| 5,293,936 | A | 3/1994 | Bridges |
| 6,189,611 | B1 | 2/2001 | Kasevich |
| 6,208,529 | B1 | 3/2001 | Davidson |
| 6,285,014 | B1 | 9/2001 | Beck et al. |
| 6,521,874 | B2 | 2/2003 | Thompson et al. |
| 7,075,392 | B2 | 7/2006 | Smith et al. |
| 7,091,460 | B2 | 8/2006 | Kinzer |
| 7,312,428 | B2 | 12/2007 | Kinzer |
| 7,359,223 | B2 | 4/2008 | Datta et al. |
| 7,484,561 | B2 | 2/2009 | Bridges |
| 7,626,836 | B2 | 12/2009 | Eggate et al. |
| 7,817,101 | B2 | 10/2010 | Cowles |
| 7,891,421 | B2 | 2/2011 | Kasevich |
| 8,453,739 | B2 | 6/2013 | Parsche |
| 8,511,378 | B2 | 8/2013 | Parsche et al. |
| 8,537,912 | B2 | 9/2013 | Long et al. |
| 8,648,760 | B2 | 2/2014 | Parsche |
| 8,763,691 | B2 | 7/2014 | Parsche |
| 8,789,599 | B2 | 7/2014 | Parsche |
| 9,664,021 | B2 | 5/2017 | Hyde et al. |
| 2001/0011590 | A1 | 8/2001 | Thomas et al. |
| 2004/0084442 | A1 | 5/2004 | La Rovere |
| 2005/0199386 | A1 | 9/2005 | Kinzer |
| 2006/0102625 | A1 | 5/2006 | Kinzer |
| 2006/0146944 | A1 | 7/2006 | Chiu |
| 2007/0215613 | A1 | 9/2007 | Kinzer |
| 2007/0252568 | A1 | 11/2007 | Chien |
| 2009/0173488 | A1 | 7/2009 | Varma |
| 2009/0189617 | A1 | 7/2009 | Burns et al. |
| 2009/0242196 | A1 | 10/2009 | Pao |
| 2010/0294488 | A1 | 11/2010 | Wheeler et al. |
| 2011/0006055 | A1 | 1/2011 | Diehl |
| 2011/0042063 | A1 | 2/2011 | Diehl et al. |
| 2011/0094755 | A1 | 4/2011 | Corbett et al. |
| 2011/0146981 | A1 | 6/2011 | Diehl |
| 2011/0253367 | A1 | 10/2011 | Banerjee et al. |
| 2011/0303423 | A1 | 12/2011 | Kaminsky et al. |
| 2012/0018140 | A1 | 1/2012 | Parsche |
| 2012/0067580 | A1 | 3/2012 | Parsche |
| 2012/0073798 | A1 | 3/2012 | Parsche et al. |
| 2012/0085537 | A1 | 4/2012 | Banerjee et al. |
| 2012/0118565 | A1 | 5/2012 | Trautman et al. |
| 2012/0125607 | A1 | 5/2012 | Parsche |
| 2012/0125609 | A1 | 5/2012 | Parsche |
| 2012/0234537 | A1 | 9/2012 | Sultenfuss et al. |
| 2013/0192825 | A1 | 8/2013 | Parsche |
| 2014/0102692 | A1 | 4/2014 | Parsche |
| 2014/0131032 | A1 | 5/2014 | Dittmer |
| 2014/0262225 | A1 | 9/2014 | Campbell et al. |
| 2014/0290934 | A1 | 10/2014 | Parsche |
| 2015/0013967 | A1 | 1/2015 | Parsche |
| 2015/0192004 | A1 | 7/2015 | Saeedfar |
| 2015/0322759 | A1* | 11/2015 | Okoniewski ............. H01Q 9/22 166/60 |
| 2015/0381401 | A1 | 12/2015 | Butterfield et al. |
| 2016/0047213 | A1 | 2/2016 | Grounds, III et al. |
| 2016/0097268 | A1* | 4/2016 | Okoniewski ............ E21B 47/00 166/248 |
| 2019/0138809 | A1 | 5/2019 | Doshi et al. |
| 2019/0145235 | A1* | 5/2019 | Okoniewski ............. H05B 6/62 166/248 |
| 2022/0178233 | A1 | 6/2022 | Nielsen et al. |

FOREIGN PATENT DOCUMENTS

| | | | |
|---|---|---|---|
| CA | 2558424 | C | 4/2014 |
| CA | 2811552 | C | 12/2014 |
| CA | 2838472 | C | 11/2018 |
| CN | 101206266 | A | 6/2008 |
| EP | 1779938 | A2 | 5/2007 |
| WO | 2005/091883 | A2 | 10/2005 |
| WO | 2008/115359 | A1 | 9/2008 |
| WO | 2012/067769 | A2 | 5/2012 |
| WO | 2016/054734 | A1 | 4/2016 |
| WO | 2017/177319 | A1 | 10/2017 |

OTHER PUBLICATIONS

International Search Report and Written Opinion dated Jun. 11, 2021 in International Patent Application No. PCT/CA2021/050456 (7 pages).

Wacker, et al., "Electromagnetic Heating for In-Situ Production of Heavy Oil and Bitumen Reservoirs", Society of Petroleum Engineers, 2011, pp. 1-14, Calgary, Canada.

* cited by examiner

SYSTEMS AND METHODS FOR CONTROLLING ELECTROMAGNETIC HEATING OF A HYDROCARBON MEDIUM

CROSS-REFERENCE TO RELATED APPLICATION

This application is a 35 USC § 371 national stage entry of International Patent Application No. PCT/CA2021/050456, filed Apr. 6, 2021, which claims priority to U.S. Provisional Patent Application No. 63/015,057 filed Apr. 24, 2020 and titled "SYSTEMS AND METHODS FOR CONTROLLING ELECTROMAGNETIC HEATING OF A HYDROCARBON MEDIUM", the entire contents of which are hereby incorporated by reference for all purposes.

FIELD

The embodiments described herein relate to electromagnetic heating, and in particular to systems and methods for controlling electromagnetic heating of a hydrocarbon medium.

BACKGROUND

The following is not an admission that anything discussed below is part of the prior art or part of the common general knowledge of a person skilled in the art.

Signal generators can be used to generate a variety of electrical signals. Certain electrical signals generated by a signal generator can be applied to a load to produce electromagnetic (EM) energy. Various properties of the electrical signals and the load may affect the EM energy produced by the load. For example, the load may have a frequency-dependent impedance which attenuates the EM energy based on the frequency of the electrical signals.

EM energy can be used to heat hydrocarbons. Similar to traditional steam-based technologies, the application of EM energy to heat hydrocarbons can reduce viscosity and mobilize bitumen and heavy oil for production or transportation.

EM heating of hydrocarbon formations can be achieved by using a load, such as an EM radiator, antenna, applicator, or lossy transmission line, positioned inside an underground reservoir to radiate, or couple, EM energy to the hydrocarbon formation. Hydrocarbon formations can include heavy oil formations, oil sands, tar sands, carbonate formations, shale oil formations, and any other hydrocarbon bearing formations, or any other mineral. It may be desirable to control the EM energy produced by a load in order to more efficiently produce or transport hydrocarbons.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

The various embodiments described herein generally relate to systems and methods for controlling electromagnetic heating of a hydrocarbon medium.

In accordance with an aspect of this disclosure, there is provided a method for controlling, using a processor, electromagnetic heating of a hydrocarbon medium using a signal generator and a load having a frequency dependent and time dependent and amplitude dependent impedance. The method involves: determining a desired heating life cycle for the hydrocarbon medium; determining a current operational state using a model of at least the hydrocarbon medium and the load; determining a desired operational state based on the current operational state and the desired heating life cycle, wherein the desired operational state is selected to maximize a fit between the desired operational state and the desired heating life cycle; determining at least one desired signal generator control setting for the signal generator, wherein the at least one desired signal generator control setting is selected to provide the desired operational state; and generating an output signal using the signal generator by applying the at least one desired signal generator control setting to the signal generator, wherein the output signal is defined to excite the load and thereby heat the hydrocarbon medium.

In any embodiment, the desired heating life cycle may define a heating profile for the load, where the heating profile varies with time; the current operational state may be determined for a present time; and the desired operational state may be selected for a future time to maximize the fit between the desired operational state and a desired state of the desired heating life cycle at the future time.

In any embodiment, the desired operational state may be selected for a future time to maximize the fit between the operational state as it evolves over time and the heating life cycle.

In any embodiment, the method may include: determining the current operational state for a present time; determining a difference between the current operational state for the present time and the desired heating life cycle for the present time; and updating the desired heating life cycle using the difference.

In any embodiment, the load may include at least one radiating structure positioned in the hydrocarbon medium. When the load is excited by the output signal, electromagnetic energy is coupled into the hydrocarbon medium by the load.

In any embodiment, a standing electromagnetic wave may be produced along a length of the at least one radiating structure through the coupling of the electromagnetic energy into the hydrocarbon medium.

In any embodiment, the at least one desired signal generator control setting may define a sequence of state transitions; applying the at least one desired signal generator control setting to the signal generator may include adjusting the signal generator between a plurality of signal generator states according to the sequence of state transitions; and the sequence of state transitions may be defined to provide a desired waveform for the output signal.

In any embodiment, the model may include at least one model parameter, and determining the current operational state may involve: determining a status of the at least one model parameter; generating an updated model by updating the model using the status of the at least one model parameter; and determining the current operational state from the updated model.

In any embodiment, each model parameter in the at least one model parameter may include an expected status of one or more properties of at least one of the signal generator, the load, and the hydrocarbon medium, where the one or more properties includes at least one of temperature, pressure, water concentration, current, voltage, impedance, and frequency, and determining the status of the at least one model parameter may involve: for a given model parameter in the at least one model parameter: determining an actual status of the one or more properties of at least one of the signal generator, the load, and the hydrocarbon medium corresponding to that given model parameter; and updating the expected status to correspond to the actual status.

In any embodiment, determining the actual status of the one or more properties may involve: applying at least one sensing signal to the load; measuring at least one reflected sensing signal from the load; and determining the actual status of the one or more properties using the at least one reflected sensing signal.

In any embodiment, determining the actual status of the one or more properties may involve: prior to applying the at least one sensing signal to the load, applying an output signal from the signal generator to the load.

In any embodiment, determining the actual status of the one or more properties may involve: prior to applying the at least one sensing signal to the load, disabling an output signal from the signal generator to the load.

In any embodiment, the at least one sensing signal may include at least two sensing signals, each of the at least two sensing signals being orthogonal with respect to the other sensing signals.

In any embodiment, the status of the at least one model parameter may be determined based on at least one of historical data and a machine learning model.

In any embodiment, the model may include at least one of an electromagnetic property, a thermal property, a fluid property, and a structural property.

In any embodiment, the model may include a transverse electromagnetic mode that may form a standing wave along a length of the load.

In any embodiment, the at least one constraint for the signal generator may include at least one of a voltage range, a current range, a frequency range, a temperature range, a maximum completion time, and a minimum power.

In any embodiment, the desired operational state may include at least one of a spatial heating profile along a length of the load, a power spectral density of the output signal, and a standing electromagnetic wave pattern along a length of the load.

In any embodiment, determining the desired operational state may include: determining a plurality of potential operational states based on the model; determining a plurality of potential cost penalties by, for each potential operational state in the plurality of potential operational states determining a potential cost penalty associated that potential operational state using the desired heating life cycle; determining a minimum cost operational state of the plurality of potential operational states, the minimum cost operational state associated with a lowest cost penalty of the plurality of cost penalties; and identifying the minimum cost operational state as the desired operational state.

In any embodiment, the desired operational state may include at least one arcing condition.

In any embodiment, a predicted future operational state may include a predicted arcing condition. Such an operational state may thereby be avoided to mitigate the possibility of arcing.

In any embodiment, determining the at least one desired signal generator control setting may be further based on at least one of historical data and a machine learning model.

In any embodiment, the method may further include: determining at least one desired load control setting for the load based on the desired operational state; and applying the at least one desired load control setting to the load.

In any embodiment, the method may further include: determining at least one desired solvent control setting for a solvent control unit based on the desired operational state, the solvent control unit for providing solvent to the hydrocarbon medium; and applying the at least one desired solvent control setting to the solvent control unit.

In accordance with an aspect of this disclosure, there is provided a system for controlling electromagnetic heating a hydrocarbon medium using a signal generator and a load having a frequency dependent and time dependent and amplitude dependent impedance. The system includes a processor configured to: determine a desired heating life cycle for the hydrocarbon medium; determine a current operational state, using a model of at least the hydrocarbon medium and the load; determine a desired operational state based on the current operational state and the desired heating life cycle, wherein the desired operational state is selected to maximize a fit between the desired operational state and the desired heating life cycle; determine at least one desired signal generator control setting for the signal generator, wherein the at least one desired signal generator control setting is selected to provide the desired operational state; and apply the at least one desired signal generator control setting to the signal generator, wherein the signal generator generates an output signal in response to the applied at least one desired signal generator control setting, and wherein the output signal is defined to excite the load and thereby heat the hydrocarbon medium.

In any embodiment, the processor may be configured to determine the desired heating life cycle to include a heating profile for the load, where the heating profile varies with time; determine the current operational state for a present time; and select the desired operational state for a future time to maximize the fit between the desired operational state and a desired state of the desired heating life cycle at the future time.

In any embodiment, the processor may be configured to determine the current operational state for a present time; determine a difference between the current operational state for the present time and the desired heating life cycle for the present time; and update the desired heating life cycle using the difference.

In any embodiment, the load may include at least one radiating structure positioned in the hydrocarbon medium. When the load is excited by the output signal, electromagnetic energy is coupled into the hydrocarbon medium by the load.

In any embodiment, a standing electromagnetic wave may be produced along a length of the at least one radiating structure through the coupling of the electromagnetic energy into the hydrocarbon medium.

In any embodiment, the at least one desired signal generator control setting may define a sequence of state transitions; the processor may be configured to apply the at least one desired signal generator control setting to the signal generator by adjusting the signal generator between a plurality of signal generator states according to the sequence of state transitions; and the sequence of state transitions may be defined to provide a desired waveform for the output signal.

In any embodiment, the model may include at least one model parameter and the processor may be configured to determine the current operational state by: determining a status of the at least one model parameter; generating an updated model by updating the model using the status of the at least one model parameter; and determining the current operational state from the updated model.

In any embodiment, each model parameter in the at least one model parameter may include an expected status of one or more properties of at least one of the signal generator, the load, and the hydrocarbon medium, wherein the one or more properties comprises at least one of temperature, pressure, water concentration, current, voltage, impedance, and frequency; and the system may further include: at least one sensor operable to measure an actual status of the one or more properties of at least one of the signal generator, the load, and the hydrocarbon medium. Determining the status of the at least one model parameter may include: for a given model parameter in the at least one model parameter: determining the actual status of the one or more properties of at least one of the signal generator, the load, and the hydrocarbon medium corresponding to that given model parameter; and updating the expected status to correspond to the actual status.

In any embodiment, determining the actual status of the one or more properties may include: applying at least one sensing signal to the load; measuring at least one reflected sensing signal from the load; and determining the actual status of the one or more properties using the at least one reflected sensing signal.

In any embodiment, determining the actual status of the one or more properties may include: prior to applying at least one sensing signal to the load, applying an output signal from the signal generator to the load.

In any embodiment, determining the actual status of the one or more properties may include: prior to applying at least one sensing signal to the load, disabling an output signal from the signal generator to the load.

In any embodiment, the at least one sensing signal may include at least two sensing signals, each of the at least two sensing signals being orthogonal with respect to the other sensing signals.

In any embodiment, the processor may be configured to determine the status of the at least one model parameter based on at least one of historical data and a machine learning model.

In any embodiment, the model may include at least one of an electromagnetic property, a thermal property, a fluid property, and a structural property.

In any embodiment, the model may include a transverse electromagnetic mode forming a standing wave along a length of the load.

In any embodiment, the at least one constraint for the signal generator may include at least one of a voltage range, a current range, a frequency range, a temperature range, a maximum completion time, and a minimum power.

In any embodiment, the desired operational state may include at least one of a spatial heating profile along a length of the load, a power spectral density of the output signal, and a standing electromagnetic wave pattern along a length of the load.

In any embodiment, the processor may be configured to determine the desired operational state by: determining a plurality of potential operational states based on the model; determining a plurality of potential cost penalties by, for each potential operational state in the plurality of potential operational states determining a potential cost penalty associated that potential operational state using the desired heating life cycle; determining a minimum cost operational state of the plurality of potential operational states, the minimum cost operational state associated with a lowest cost penalty of the plurality of cost penalties; and identifying the minimum cost operational state as the desired operational state.

In any embodiment, the desired operational state may include at least one arcing condition.

In any embodiment, the processor may be configured to determine the at least one desired signal generator control setting is further based on at least one of historical data and a machine learning model.

In any embodiment, the processor may be further configured to: determine at least one desired load control setting for the load based on the desired operational state; and apply the at least one desired load control setting to the load.

In any embodiment, the processor may be further configured to: determine at least one desired solvent control setting for a solvent control unit based on the desired operational state, the solvent control unit for providing solvent to the hydrocarbon medium; and apply the at least one desired solvent control setting to the solvent control unit.

In accordance with an aspect of this disclosure, there is provided a system for electromagnetic heating a hydrocarbon medium. The system includes a signal generator, a load, and a processor. The signal generator can generate an output signal. The load has a frequency dependent and time dependent impedance and can be excited by the output signal to heat the hydrocarbon medium. The processor is configured to: determine a desired heating life cycle for the hydrocarbon medium; a current operational state, using a model of at least the hydrocarbon medium and the load; determine a desired operational state based on the current operational state and the desired heating life cycle, wherein the desired operational state is selected to maximize a fit between the desired operational state and the desired heating life cycle; determine at least one desired signal generator control setting for the signal generator, wherein the at least one desired signal generator control setting is selected to provide the desired operational state; and apply the at least one desired signal generator control setting to the signal generator, wherein the signal generator generates an output signal in response to the applied at least one desired signal generator control setting, and wherein the output signal is defined to excite the load and thereby heat the hydrocarbon medium.

It will be appreciated that the aspects and embodiments may be used in any combination or sub-combination. Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
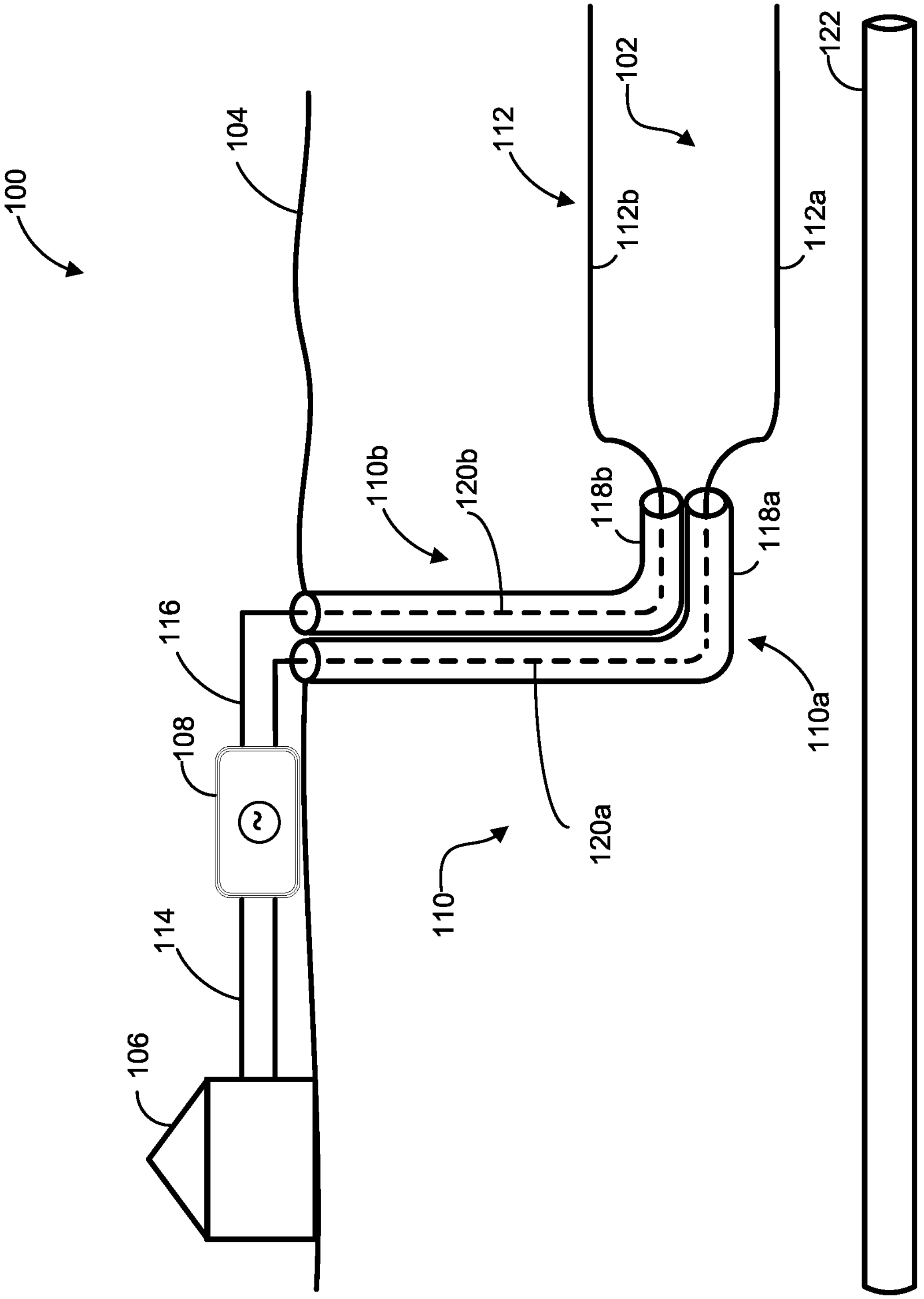
FIG. 1 is profile view of an example system for electromagnetic heating of a hydrocarbon formation in accordance with an embodiment.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more elements are said to be "coupled", "connected", "attached", or "fastened" where the parts are joined or operate together either directly or indirectly (i.e., through one or more intermediate parts), so long as a link occurs. As used herein and in the claims, two or more elements are said to be "directly coupled", "directly connected", "directly attached", or "directly fastened" where the element are connected in physical contact with each other. None of the terms "coupled", "connected", "attached", and "fastened" distinguish the manner in which two or more elements are joined together.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

Embodiments described herein may relate to and/or involve the use of time-harmonic signals. As a skilled reader will appreciate, references to phase shifts or phase differences between time-harmonic (e.g. a single frequency sinusoidal) signals can also be expressed as a time delay. For time harmonic signals, time delay and phase difference convey the same physical effect. For example, a 180° phase difference between two time-harmonic signals of the same frequency can also be referred to as a half-period delay. As a further example, a 90° phase difference can also be referred to as a quarter-period delay. References to time delay(s) may be used as a more general term for comparing periodic signals. For instance, if the periodic signals contain multiple frequencies (e.g. a series of rectangular or triangular pulses), then the time lag between two such signals having the same fundamental harmonic may be referred to as a time delay. For simplicity, in the description that follows, in the case of single frequency sinusoidal signals the term "phase shift" shall be used. In the case of multi-frequency periodic signals, the term "phase shift" will be understood to refer to the time delay equal to the corresponding time delay of the fundamental harmonic of the two signals.

As used herein, the term "radio frequency" may extend beyond the conventional meaning of radio frequency. As used herein, the term "radio frequency" generally includes frequencies at which the physical dimensions of system components are comparable to the wavelength of the EM wave. System components that are between approximately 1/16 of a wavelength to 10 wavelengths can be considered comparable to the wavelength. For example, a 1 kilometer (km) long underground system that uses EM energy to heat underground formations and operates at 50 kilohertz (kHz) will have physical dimensions that are comparable to the wavelength. If the underground formation has significant water content, (e.g., relative electrical permittivity being approximately 60 and conductivity being approximately 0.002 S/m), the EM wavelength at 50 kHz is 303 meters. The length of the 1 km long radiator is approximately 3.3 wavelengths. If the underground formation is dry (e.g., relative electrical permittivity being approximately 6 and conductivity being approximately 3E-7 S/m), the EM wavelength at 50 kHz is 2450 meters. The length of the radiator is then approximately 0.4 wavelengths. Therefore, in both wet and dry scenarios, the length of the radiator is considered comparable to the wavelength in the context of the disclosure herein. Accordingly, effects typically seen in conventional radio-frequency (RF) systems will be present and while a frequency of 50 kHz is not typically considered an RF frequency, in the disclosure herein such a system may be considered to be an RF system.

Referring to FIG. 1, shown therein is a profile view of an apparatus 100 for electromagnetic heating of hydrocarbon formations in accordance with an embodiment. The apparatus 100 can be used for electromagnetic heating of a hydrocarbon formation 102. The apparatus 100 includes an electrical power source 106, an electromagnetic (EM) wave generator 108 (also referred to as a signal generator), a waveguide portion 110, and transmission line conductor portion 112. As will be appreciated, the apparatus 100 shown in FIG. 1 is provided for illustration purposes only and other suitable configurations of an apparatus for electromagnetic heating of hydrocarbon formations are possible.

As shown in FIG. 1, the electrical power source 106 and the electromagnetic wave generator 108 can be located at the surface 104. Alternately, one or both of the electrical power source 106 and the electromagnetic wave generator 108 can be located below ground.

The electrical power source 106 generates electrical power. The electrical power source 106 can be any appropriate source of electrical power, such as a stand-alone electric generator or an electrical grid. The electrical power source 106 may include transformers and/or rectifiers for providing electrical power with desired and/or required parameters. The electrical power may be one of alternating current (AC) or direct current (DC). Power cables 114 carry the electrical power from the electrical power source 106 to the EM wave generator 108.

The EM wave generator 108 generates EM power. It will be understood that EM power can be generated in various forms including high frequency alternating current, alternating voltage, current waves, or voltage waves. For example, the EM power can be a periodic high frequency signal having a fundamental frequency (f0). The high frequency signal may have a sinusoidal waveform, square waveform, or any other appropriate signal shape. The high frequency signal can further include harmonics of the fundamental frequency. For example, the high frequency signal can include second harmonic $2f_0$, and third harmonic $3f_0$ of the fundamental frequency $f_0$. In some embodiments, the EM wave generator 108 can produce more than one frequency at a time. In some embodiments, the frequency and shape of the high frequency signal may change over time. The term "high frequency alternating current", as used herein, broadly refers to a periodic, high frequency EM power signal, which in some embodiments, can be a voltage signal.

As noted above, the EM wave generator 108 may be located above-ground. An apparatus with the EM wave generator 108 located above ground rather than underground can be easier to deploy.

Alternately, the EM wave generator may be located underground. When the EM wave generator 108 is located underground, transmission losses may be reduced because EM energy is not dissipated in areas that do not produce hydrocarbons (e.g. along the waveguide portion distance between the EM wave generator 108 and the transmission line conductor portion 112).

The waveguide portion 110 can carry high frequency alternating current from the EM wave generator 108 to the transmission line conductors 112*a* and 112*b*. Each of the transmission line conductors 112*a* and 112*b* can be coupled to the EM wave generator 108 via individual waveguides 110*a* and 110*b*. As shown in FIG. 1, the waveguides 110*a* and 110*b* can be collectively referred to as the waveguide portion 110.

Each of the waveguides 110*a* and 110*b* can extend between a respective proximal end and a distal end. The proximal ends of each waveguide 110*a* and 110*b* can be connected to the EM wave generator 108. The distal ends of each waveguide 110*a* and 110*b* can be connected to the transmission line conductors 112*a* and 112*b* respectively.

As shown in the example of FIG. 1, each waveguide 110*a* and 110*b* can be provided by a coaxial transmission line having an outer conductor 118*a* and 118*b* and an inner conductor 120*a* and 120*b*, respectively. For example, each of the waveguides 110*a* and 110*b* may be provided using a metal casing pipe as the outer conductor with the metal casings concentrically surrounding pipes, cables, wires, or conductor rods, as the inner conductors. Optionally, the outer conductors 118*a* and 118*b* can be positioned within at least one additional casing pipe along at least part of the length of the waveguide portion 110.

The transmission line conductor portion 112 can be coupled to the EM wave generator 108 via the waveguide portion 110. As shown in FIG. 1, the transmission line conductors 112*a* and 112*b* may be collectively referred to as the transmission line portion 112. In the example shown in FIG. 1, the transmission line portion 112 includes two transmission line conductors 112*a* and 112*b*. Optionally, the transmission line portion 112 may also include additional transmission line conductors.

Various configurations of the transmission line conductors 112*a* and 112*b* may be used. For example, both transmission line conductors 112*a* and 112*b* may be defined by a pipe. Alternately, only one or none of the transmission line conductors 112*a* and 112*b* may be defined by a pipe.

Alternately or in addition, one or both of the transmission line conductors 112*a* and 112*b* may be provided using conductor rods, coiled tubing, or coaxial cables, or any other suitable conduit usable to propagate EM energy from EM wave generator 108.

In the example shown in FIG. 1, the transmission line conductors 112*a* and 112*b* are positioned in direct contact with the hydrocarbon formation 102. Alternately, the transmission line conductors 112 may be electrically isolated or partially electrically isolated from the hydrocarbon formation 102.

The transmission line conductors 112*a* and 112*b* have a proximal end (proximate the waveguide portion 110) and a distal end (spaced apart from the waveguide portion 110). The proximal end of each transmission line conductor 112*a* and 112*b* can be coupled to the EM wave generator 108. For example, the proximal end of each transmission line conductor 112*a* and 112*b* can be coupled to the EM wave generator 108 via the corresponding waveguides 110*a* and 110*b* as shown in FIG. 1.

The transmission line conductors 112*a* and 112*b* can be excited by the high frequency alternating current generated by the EM wave generator 108. When excited, the transmission line conductors 112*a* and 112*b* can form an open transmission line that includes transmission line conductors 112*a* and 112*b* and medium 102. The transmission line can propagate EM energy that is contained within a cross-section of a radius of several meters to several tens of meters depending on the frequency of excitation. The open transmission line can propagate an EM wave from the proximal end of the transmission line conductors 112*a* and 112*b* to the distal end of the transmission line conductors 112*a* and 112*b*. The open transmission line can also propagate a reflected EM wave in the opposite direction from the distal end to the proximal end upon reflection of the EM wave at the distal end.

Optionally, the EM wave may establish a standing wave along the transmission line 112. Alternately, the propagating electromagnetic wave may form a standing electromagnetic wave or an exponentially decaying wave depending on the loss properties of the medium and the frequency of generator excitation.

An open transmission line can carry and dissipate energy within the dielectric medium. In the example of apparatus 100, the hydrocarbon formation 102 between the transmission line conductors 112*a* and 112*b* can act as a dielectric medium for the open transmission line formed by the transmission line conductors 112*a* and 112*b*. The open transmission line can carry and dissipate energy within this dielectric medium, that is, the hydrocarbon formation 102.

The open transmission line carrying EM energy within the hydrocarbon formation 102 may be referred to as a "dynamic transmission line" as medium properties change over time. The transmission line conductors 112 can be configured to propagate an EM wave in both directions as described above. This can allow the dynamic transmission line to carry EM energy within long well bores (as used herein, well bores spanning a length of 500 meters (m) to 1500 meters (m) or more can be considered long well bored).

Producer well 122 is typically located at or near the bottom of the underground reservoir. The producer well 122 can be configured to receive heated oil released from the hydrocarbon formation 102 by the EM heating process. The heated oil can drain mainly by gravity to the producer well 122.

The producer well 122 can define a longitudinal well axis. The transmission line conductors 112*a* and 112*b* may also extend along respective transmission line longitudinal axes. The longitudinal well axis and the transmission line longitudinal axes may be parallel or even coincident. Thus, the transmission line conductors 112*a* and 112*b* may extend in a direction generally parallel to the producer well 122 (e.g. along an axes coincident with a vertical projection of the producer well 122).

As shown in the example of FIG. 1, producer well 122 is substantially horizontal (i.e., parallel to the surface). The transmission line conductors 112*a* and 112*b* may also extend in a substantially horizontal direction.

The producer well 122 may be located at the same depth or at a greater depth than (i.e. below) at least one of the transmission line conductors 112*a*, 112*b* of the open transmission line 112. Alternately, the producer well 122 can be located above the transmission line conductors 112*a*, 112*b* of the open transmission line 112.

The producer well 122 may be positioned laterally in between the transmission line conductors 112*a*, 112*b*. For example, the producer well 122 may be positioned centered between the transmission line conductors 112*a*, 112*b*. Alternately, the producer well 122 may be positioned with any appropriate offset from the lateral center between the transmission line conductors 112*a*, 112*b*. In some applications, it may be advantageous to position the producer well 122 closer to a first transmission line conductors than a second transmission line conductor. This may allow the region closer to the first transmission line conductor to be heated faster and contribute to early onset of oil production.

As the hydrocarbon formation 102 is heated, steam may also be released that displaces the heated oil that has drained to and is collected in the producer well 122. Steam may assist in driving heated oil toward the producer in addition to gravity. The steam can accumulate in a steam chamber above the producer well 122. Direct contact between the steam chamber and the producer well 122 can result in a drop in system pressure, which can increase steam and water production but may reduce oil production. Thus, maintaining separation between the steam chamber and the producer well 122 for as long as possible during operation may facilitate increased oil production.

The open transmission line provided by the transmission line conductors 112 may facilitate providing wide and flat heated areas. The width of the heated area can be varied by adjusting the lateral separation between the transmission line conductors 112*a* and 112*b*. However, the hydrocarbon formation 102 between the transmission line conductors 112*a* and 112*b* may not be heated uniformly until the whole hydrocarbon formation 102 between the transmission line conductors 112*a* and 112*b* is desiccated. Regions closer to the respective transmission line conductors 112*a* and 112*b* may initially be heated much more strongly than the regions further from the transmission line conductors 112*a* and 112*b*, including the region between the transmission line conductors 112*a* and 112*b*.

In some applications, it can be advantageous for the distance between the transmission line conductors 112*a* and 112*b* to be narrow to encourage early onset of oil production. However, a wider distance (e.g. larger than 8 meters) between the transmission line conductors 112*a* and 112*b* may encourage long term oil production by maintaining a separation between the producer well 122 and the steam chamber (i.e., maintaining a disconnected steam chamber).

Underground reservoir simulations indicate that heating an area approximately 2 meters to 8 meters above the producer well 122 can create a steam chamber that is more favorable than when the heated area is narrow, even if the total EM power used for heating is the same. In this context, a region of approximately 8 meters to 40 meters can be considered wide while a region with a width of less than approximately 8 meters can be considered narrow. A more favorable steam chamber is a chamber which stays 'disconnected' (i.e., remains separated) from the producer well 122 for a longer period of time.

It may also be desirable to maximize the efficiency of the reservoir heating, to promote the cost effectiveness of oil production. By focusing the reservoir heating on oil producing regions of the hydrocarbon formations, rather than regions of poor oil saturation or with physical barriers (e.g. shale) preventing oil flow, radiation losses may be reduced and thus the overall production costs (both in terms of monetary value and energy costs) may be reduced.

Producing heat laterally far from the open transmission line, while minimizing heating of the under-burden (i.e., region below the underground reservoir) and/or over-burden layers (i.e., region above the underground reservoir) may promote efficiency in the oil production process. Heating of the under-burden region and/or over-burden region does not generally result in oil production, and therefore the energy used to heat these regions effectively represents radiation losses.

The EM wave generator 108 may be configured to accommodate a wide load impedance range. The electromagnetic properties of the hydrocarbon formation 102 may vary significantly throughout the heating process, and thus the EM wave generator 108 may be operable to respond to changes in the hydrocarbon formation 102.

System 100 may be configured to operate according to a specified operational life-cycle. The operational life-cycle can define a desired heating life cycle for formation 102. The desired heating life cycle may specify the heating profile within the formation 102 over the course of the operational lifespan of the electromagnetic heating provided by system 100. The desired heating life-cycle (and corresponding operational life-cycle) may be defined based on characteristics of system 100, hydrocarbon medium 102, and the interaction between various components of system 100 and medium 102.

The heating life cycle is a component of the overall production life-cycle. The heating life cycle may be optimized accounting for various operational factors such as cost, yield, minimized energy usage, energy efficiency and so forth. The operational life-cycle can be defined to optimize the efficiency of heating the medium 102 to facilitate hydrocarbon extraction, subject to constraints imposed by the system 100 and the nature of the medium 102. In some cases, the operational life-cycle (and the desired heating life cycle) may be adaptable or modifiable in response to feedback from various components of system 100, such as the generator 108 and/or sensors. System 100 can be configured to monitor feedback from system component such as the generator 108 and sensors (not shown) to adapt the desired heating life cycle to reflect the current state of the system 100, hydrocarbon formation 102 and the overall extraction process. System 102 can also be configured to update the desired heating life cycle based on predictive modelling of the system 100, hydrocarbon formation 102 and the overall extraction process.

The desired heating life-cycle of system 100 can be defined to optimize heating over various different heating phases predicted for the medium 102. The desired heating life-cycle of system 100 may be defined in order to provide desired heating characteristics (e.g. a desired spatial heating profile) along a corridor of the medium 102 over time. The corridor may be defined as the portion of the hydrocarbon medium 102 surrounding the transmission line conductor portion 112. The desired heating characteristics can be used to determine control settings for the generator 108 by identifying the control settings expected to provide the desired heating characteristics (or near to the desired heating characteristics).

In some examples, heating of hydrocarbon formation 102 can may described by four distinct heating phases, in which different electromagnetic, thermodynamic, and fluid-dynamic mechanisms may be present. Depending on the length of the transmission line conductors 112, the various properties of the hydrocarbon formation 102, and the desired heating strategy, it may be desirable to operate the apparatus 100 to transition between these different heating phases at different times.

The desired heating characteristics defined by the desired heating life-cycle may be specified to change over time as the characteristics of the medium 102 change. The desired heating life-cycle may also be adjustable to adapt the desired heating characteristics in response to feedback from various components of system 100, such as generator 108 and/or one or more sensors, and/or outputs from predictive modelling of the system 100 and/or medium 102.

In a first heating phase, a high concentration of water may be present in the regions of the hydrocarbon formation 102 surrounding the transmission line conductors 112. As a result, impedance experienced by EM waves propagating along the transmission line conductors 112 will be mostly resistive, and high frequencies of the EM waves will be greatly attenuated.

In a second heating phase, water begins to diffuse away or partially evaporate from areas near the transmission line conductors 112. The water reduction can decrease the conductivity of the hydrocarbon formation 102. At the same time, the temperature of the hydrocarbon formation 102 around the transmission line conductors 112 increases. This increase in temperature can increase the conductivity of the hydrocarbon formation 102, counteracting some or all of the decrease caused by the water reduction.

In a third heating phase, water around the transmission line conductors 112 vaporizes and carries heat away from the transmission line conductors 112. The vaporized water can then condense and partially diffuse back toward the transmission line conductors 112, due to a water concentration gradient.

In a fourth heating phase, hydrocarbons begin to flow into the producer well 122, reducing the pressure in the regions of the hydrocarbon medium 102 near the transmission line conductors 112. More steam is produced in this region, lowering the water concentration, and increasing the resistance. A steam chamber may be established during this heating phase.

The desired heating characteristics defined by the desired heating life-cycle may change to reflect the different heating phases of the formation 102.

Figure 2A:
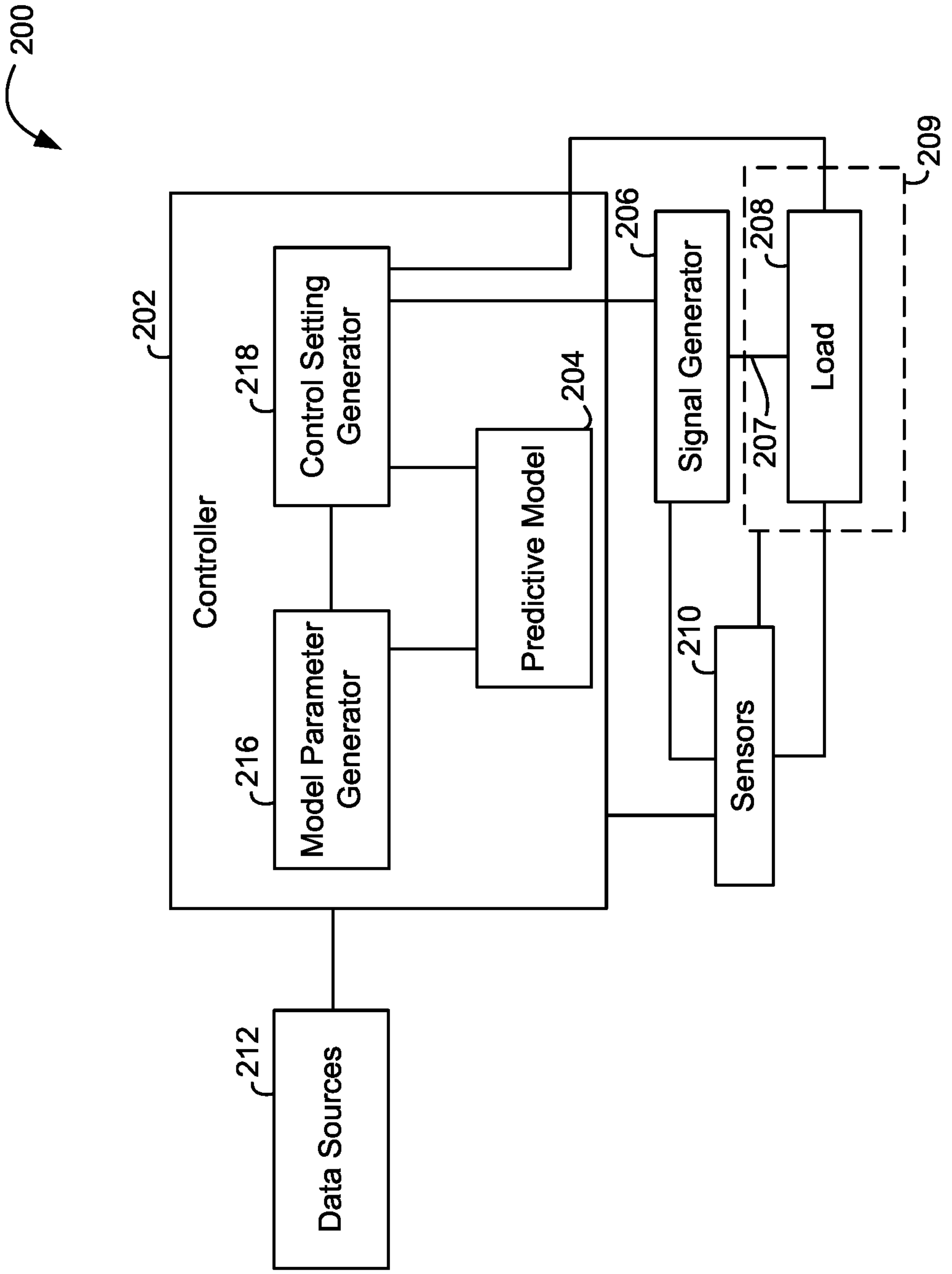
FIG. 2A is a block diagram of an example system for controlling electromagnetic heating of a hydrocarbon medium in accordance with an embodiment.

Referring to FIG. 2A, shown therein is a block diagram of an example system 200 for controlling electromagnetic heating of a hydrocarbon medium 209. The example electromagnetic heating control system 200 includes a signal generator 206, a load 208, a controller 202, sensors 210, and data sources 212.

In the example shown in FIG. 2A, only some of the components of the electromagnetic heating control system 200 are depicted as being positioned within the hydrocarbon medium 209 in FIG. 2A. However, it will be appreciated that any or all of the components of system 200 may be positioned within hydrocarbon medium 209 in the embodiments described herein.

The hydrocarbon medium 209 may refer to any formation, body, or structure that stores or contains hydrocarbons. The hydrocarbon medium 209 may be an underground formation. Alternately or in addition, the hydrocarbon medium 209 may include above ground storage.

In some embodiments, the electromagnetic heating control system 200 can be implemented as the electromagnetic hydrocarbon heating apparatus 100 shown in FIG. 1. For example, the signal generator 206 can perform the functions of the electromagnetic wave generator 108, the load 208 may be defined to include the transmission line conductors 112 and the coupling member 207 provided by the waveguide portion 110.

The signal generator 206 is operable to generate one or more output signals that can be applied to load 208. The output signals generated by the signal generator 206 can include more than one frequency. In some examples, the output signals may include a band of frequencies.

The output signals can be generated with various different frequencies. For example, the output signals may be generated with a bandwidth between 0 to 1 kilohertz (kHz). Alternately or in addition, the output signals may be generated with a bandwidth between about 1 kilohertz (kHz) to about 100 megahertz (MHz). Alternately or in addition, the output signals may be generated with a bandwidth that is within the radio frequency (RF) band. An output signal generated by the signal generator 206 may be characterized by a power spectral density, or a measure of the power of the signal as a function of frequency.

The signal generator 206 can include various components (not shown) that can be configured to vary the characteristics of the output signals produced. For example, the signal generator 206 may include one or more components which can be configured to modify the frequency, voltage, current, power, phase, or other property of the output signals. The signal generator 206 may be configured to control the power spectral density of the output signal. The signal generator 206 may also include components operable to vary the output impedance (or resistance or reactance) of the signal generator 206. There may be more than one configuration of the signal generator 206 operable to result in the same output signal and/or output impedance.

Optionally, signal generator 206 can be configured to generate an output signal that includes a plurality of pulses. For example, the signal generator 206 may include a switch module that includes a switched H-bridge. The signal generator 206 may be configured to switch the H-bridge according to a specified pulse sequence of state transitions. The specified pulse sequence may be defined in order to provide desired operational characteristics for the output signal such as a desired power spectral density.

The signal generator 206 may include one or more signal generating sub-units. Optionally, the signal generator 206 may also include signal conditioning components usable to adjust the characteristics of the output signal.

Figure 2B:
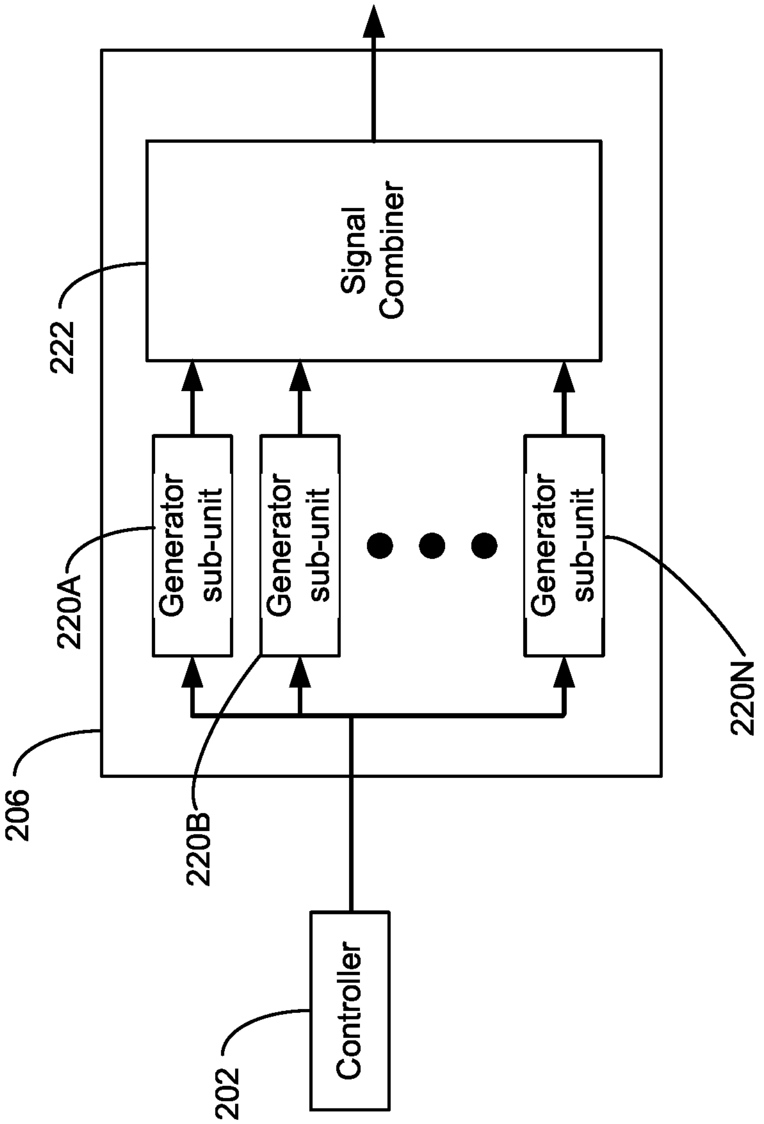
FIG. 2B is a block diagram of an example signal generator that may be used with the system of FIG. 2A in accordance with an embodiment.

Referring now to FIG. 2B, shown therein is an example configuration of the signal generator 206 that may be used with the system 200 shown in FIG. 2A. As shown in the example of FIG. 2B, the signal generator 206 may include a plurality of signal generation sub-units 220A-220N. Alternately, the signal generator 206 may include only a single signal generation sub-unit 220.

Each signal generation sub-unit 220 may be configured to generate an output signal portion. The output signal portion generated by each of the generator sub-units 220A-220N can be coupled to signal combiner 222. Signal combiner 222 can combine the one or more output signal portions received from the generator sub-units 220A-220N to generate a combined output signal. The combined output signal can then be provided to the load 208.

The signal combiner 222 can be implemented in various different ways. For example, the signal combiner 222 can include one or more transformers. In some cases, the signal combiner 222 may include multiple transformers e.g., each with a separate transformer core. Each transformer may be coupled to a corresponding one of the generator sub-units 220.

Alternately, the signal combiner 222 may include only a single transformer. For example, the signal combiner 222 may include a single transformer with multiple primary windings and a single secondary winding, with each winding sharing a common transformer core. Each primary winding can be coupled to a corresponding one of the generator sub-units 220.

In some cases, the signal combiner 222 may include an arrangement of other components, such as capacitors, inductors, or other components in addition to, or in place of, the transformer(s). In some cases, the signal combiner 222 may be a Wilkinson-type combiner.

Each generator sub-unit 220 can be configured to generate a corresponding output signal portion. Each generator sub-unit 220 may be adjustable between a plurality of sub-unit states. The individual generator sub-units 220 can be configured to adjust between the sub-unit states in order to generate a desired signal output portion. For example, each generator sub-unit 220 may include a switch module that is adjustable between a plurality of switch states. The plurality of sub-unit states for a given generator sub-unit 220 may be defined by the plurality of switch states for that generator sub-unit 220.

Controller 202 may be configured to define a sequence of state transitions for the signal generator 206. The sequence of state transitions can be defined in order to provide a desired waveform for the output signal. The sequence of state transitions can be provided to one or more of the generator sub-units 220 to control adjustment of the individual generator sub-unit 220 between the plurality of sub-units states. In some cases, one or more generator sub-units 202 may be operable in a static mode (i.e. in which the generator sub-unit 202 remains in a fixed sub-unit state and does not transition between sub-unit states) while one or more active generator sub-units 220 is adjusted according to a specified sequence of state transitions defined by controller 202. Controller 202 may be configured to active a specified number and/or group of generator sub-units 220 to provide the output signal with desired signal characteristics.

In some examples, each generator sub-unit 220 may include a switch module. The switch module can include one or more switches. The switch module may be configured to can receive a module input signal and provide a corresponding module output signal. The module output signal can be used to generate the output signal portion for that generator sub-unit 220.

The switch module can be provided in various arrangements. For example, the switch module may include a plurality of switches in an H-bridge and/or half H-bridge arrangement. Alternately or in addition, the switch module may include, but is not limited to including, a buck converter, a buck-boost converter, a resonant converter, a soft switching converter, and/or a zero-voltage switching converter. In some cases, the switch module may include combinations of these arrangements, such as a plurality of H-bridges connected in parallel and/or series. In some cases, a switch module may be provided by a single switch, such as a single FET switch for example. The components used for the switch module may be selected based on the desired current and/or voltage levels for the particular implementation.

Each of the switches in the switch module can be configured in a closed position or an open position. When a switch is in an open position, signals can pass through the switch. Conversely, when a switch is in a closed position, signals cannot pass through the switch. The switches can be actuated from an open position to a closed position or a closed position to an open position. The switches can be any suitable type of switch, including, but not limited to, transistors, MOSFETs, BJTs, IBJTs, and/or thyristors.

The current flow through a switch module can depend on the particular configuration of the switches in that switch module. A particular configuration of the switches may be referred to as a switch state. Each switch module may be adjustable between a plurality of switch states. The plurality of sub-units states for a given generator sub-unit 220 may be defined as the plurality of switch states for the corresponding switch module.

As noted above, each generator sub-unit 220 can be configured to undergo a sequence of sub-unit state transitions. The sub-unit state transitions can be defined to generate a desired sub-unit waveform, e.g. a signature waveform of short duration or a wavelet. The signal waveform generated by the generator sub-unit 220 can define the signal output portion for that generator sub-unit 220. The combined output signal generated by signal combiner 222 may then provide a composition or superposition of these wavelet signature functions.

The combined output signal can be defined to provide an excitation signal that can be applied to the load 208. Alternately or in addition, the combined output signal can be defined to provide a sensing signal that can be applied to the load 208.

Referring again to FIG. 2A, a coupling member 207 connects the signal generator 206 to the load 208. The coupling member 207 may facilitate the transfer of one or more output signals from signal generator 206 to load 208. The coupling member 207 may be implemented by various conduits, such as a waveguide or coaxial cable, as with waveguide portion 110 of apparatus 100. Referring back to the example of apparatus 100, the waveguide portion 110 defines a coupling member between the signal generator 108 and the load defined by the transmission line conductor portion 112.

The coupling member 207 may also be referred to as a connecting cable. The connecting cable 207 can include one or more conductors that act as one or more electrical transmission lines between the signal generator 206 and the load 208.

The coupling member 207 may be considered part of the load 208. The coupling member 207 can include a transition region, which has a lower impedance relative to other regions of the coupling member 207. The lower impedance of the transition region can result in lower voltages in the transition region, minimizing electrical arcing that may be caused by high voltages. In some cases, the transition region can be located at the connection between the coupling member 207 and the load 208.

The load 208 can be any component that can receive output signals generated by the signal generator 206 and produce one or more propagating, partial or full standing electromagnetic waves or exponentially decaying waves along its length. For example, the load 208 can be a radiator, antenna, applicator, or lossy transmission line. In some embodiments, the load 208 can be an inductive heating coil.

In general, the load 208 may be provided as an electromagnetic energy coupling system or radiating structure positioned within a region of the hydrocarbon medium that is to be heated. Typically, the load 208 may include a lossy transmission line structure extending in a longitudinal direction. However, various types of radiating structures may be used for the load 208 in different implementations.

The load 208, consisting of a radiating structure, can be positioned within the hydrocarbon medium. This forms a radiating structure corridor. The radiating structure corridor can be defined as the portion of the hydrocarbon medium surrounding the load 208 (e.g. surrounding the radiating structures 208A-208C). The radiating structure corridor may be defined as an approximately cylindrical region surrounding the radiating structure conductors of the load 208 (e.g. radiating structures 208A-208C) that is influenced by electromagnetic heating resulting from the excitation signal from the generator 206. In other words, 209 may represented the hydrocarbon medium payload layer in which the radiating structure 208 is placed forming a corridor of radiation that is roughly cylindrical in shape. This corridor of radiation may envelop the radiating structure conductors 208 and the producer pipe 122.

Figure 3A:
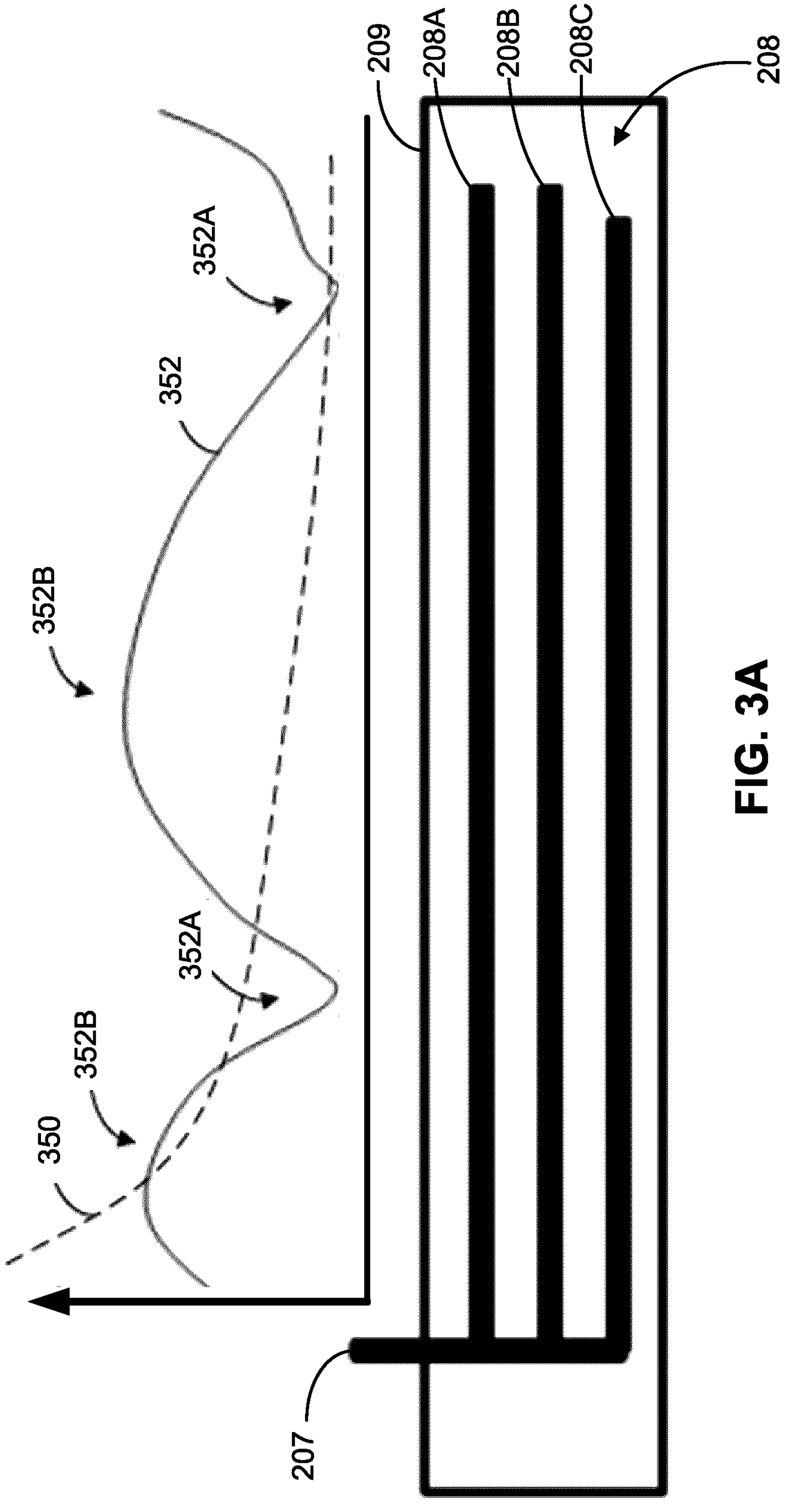
FIG. 3A is an illustration of example electromagnetic waves that may be generated using the system of FIG. 1 in accordance with an embodiment.

Referring now to FIG. 3A, shown therein is a plot illustrating example electromagnetic waves 350, 352 that may be produced by the load 208. The electromagnetic waves 350, 352 may be produced by the load 208 when output signals from the signal generator 206 are applied to the load 208.

As shown in FIG. 3A, the load 208 can include one or more radiating structures 208A-C. The plot shown in FIG. 3A illustrates the voltage of the example standing waves 350, 352 along the length of the radiating structures 208A-C.

The radiating structures 208A-C can be connected to the signal generator (not shown), via the coupling member 207. In the example shown in FIG. 3A, the radiating structures 208A-C are shown as linear structures in a horizontal parallel arrangement. Various other geometries and arrangements of the radiating structures 208A-208C may also be used. For example, vertical, slanted, and unevenly spaced arrangements of the radiating structures 208A-208C may be used.

As illustrated, the voltage of the standing electromagnetic waves 350, 352 can vary along the length of the load 208. The profile or shape of the electromagnetic waves 350, 352 may vary depending on the power spectral density of the respective output signals.

As explained herein above, signal generator 206 can produce an excitation signal that is coupled to the load 208. When the load 208 is excited by the excitation signal, electromagnetic energy can be coupled into the hydrocarbon medium 209 by the load 208.

The coupling of the electromagnetic energy into the hydrocarbon medium 209 by the load 208 can take various forms. For example, the coupling may be a resistive coupling wherein the hydrocarbon medium behaves as resistive material. Alternately, the coupling may be an inductive coupled eddy current. Alternately, the coupling may be a lossy electromagnetic wave. Accordingly, while the term radiating structure is used herein, it should be understood that this radiating structure can couple electromagnetic energy into the hydrocarbon medium by general modes when electrically excited. In the example mode of a lossy electromagnetic wave coupling a standing electromagnetic wave can be produced along a length of the at least one radiating structure. In some cases, if the attenuation of the coupled electromagnetic wave is high then there will not be a standing wave but rather an exponentially decaying signal strength of the electromagnetic wave along the length of the at least one radiating structure. In the examples described herein, such an exponentially decaying wave can also be considered as an electromagnetic standing wave.

The electromagnetic waves 350/352 can include standing wave components produced by the load 208 that correspond to the properties of the excitation signal. For instance, the standing wave components can be related to the power spectral density of the excitation signal generated by the signal generator 206.

The shape of the electromagnetic waves 350, 352 may also vary based on the properties of the hydrocarbon medium 209. The standing wave components may be related to the power dissipation that occurs within the corridor surrounding the load 208 (e.g. the portion of the hydrocarbon medium surrounding the load 208) along the longitudinal length of the load 208. For example, the standing wave may be determined as the square magnitude transverse field or transverse current along the radiating structure averaged over a time constant epoch. The standing wave that is present along the corridor may vary with changes in the excitation signal and/or the nature of the load 208 and/or hydrocarbon medium 209.

For example, when the hydrocarbon medium 209 is highly lossy, such as when there is a high water concentration, the voltage may decay exponentially, as illustrated by the example electromagnetic wave 350. The example electromagnetic wave 350 shown in FIG. 3A has the form of an attenuated forward propagating wave. Conversely, when the hydrocarbon medium 209 is not highly lossy, such as when there is a low water concentration, the output signals applied to the load 208 can propagate and partially reflect back and forth along the load 208. The reflections can result in an electromagnetic wave having a partial standing wave pattern, as illustrated by the example electromagnetic wave 352.

The example electromagnetic wave patterns 350, 352 may include one or more propagating wave components. The propagating wave components may include significant reflections from both the proximal and distal ends of the radiating structure. In some cases, changes of the electromagnetic properties along the radiating structure may also result in wave reflections. The electromagnetic wave patterns 350, 352 may also be time-varying. That is, the position of the peaks and troughs of the electromagnetic field density can change over time and/or can change with frequency of generator excitation. For example, the standing wave patterns 350, 352 may be varied over time by modulating the output signals applied to the load 208.

The electromagnetic wave patterns 350, 352 correspond to spatial heating profiles averaged over the radiating corridor along the length of the load 208. For example, less heat may be generated in the low voltage regions 352A than in the high voltage regions 352B of the electromagnetic wave 352. Accordingly, the spatial heating profile can be controlled by controlling the wave profile along the load 208, i.e. by controlling the characteristics of the output signals applied to the load 208.

The spatial heating profile may be adjusted to increase the efficiency of hydrocarbon heating. For example, the spatial heating profile may be adjusted to minimize heating in areas of the hydrocarbon medium 209 expected to provide inefficient oil production. For example, heating may be minimized in areas that have already produced oil, or in areas associated with poor pay zones that may not be economic (e.g. monetarily or energy-wise) to produce. For example, the spatial heating profile can be configured to focus power to regions where hydrocarbon has not yet been sufficiently extracted, and minimize heating in areas that are depleted or where the formation has poor initial hydrocarbon saturation. The spatial heating profile may also be configured to minimize high voltage regions (or "hot-spots") that may result in electrical arcing and potential equipment damage.

Referring back to FIG. 2A, the load 208 can have a frequency-dependent impedance. That is, the impedance experienced by a signal applied to the load 208 may depend on the frequency of the applied signal.

The generator 206 can be configured to produce an excitation signal that is connected to the load 208. The coupling between the generator 206 and load 208 may depend on the frequency of the excitation signal generated by the generator 206. That is, the impedance of the load 208 may be frequency dependent and the impedance of the load 208 may vary based on the frequency of the excitation signal generated by the generator 206. Accordingly, coupling between the generator 206 and the load 208 may be adjusted by controlling the attributes of the excitation signal produced by generator 206 such as the frequency of the excitation signal.

The coupling between the generator 206 and load 208 affects the ability of the load 208 to couple heat into the medium 209. Accordingly, the coupling is a component of the overall heating life cycle.

The frequency-dependent impedance of the load 208 may depend on the electromagnetic properties of the hydrocarbon medium 209 surrounding the load 208 (i.e. the radiating structure). The mechanical configuration of the load 208 includes, for example, the geometry of the load 208.

The frequency-dependent impedance of the load 208 may also be affected by the environment in which the load 208 is positioned. For example, the impedance of the load 208 can be affected by the material composition of the hydrocarbon medium 209.

Alternately or in addition, the load 208 can have an input time-dependent impedance. For instance, the input impedance of the load 208 may change as the electromagnetic properties of the hydrocarbon medium changes over time due to heating of the hydrocarbon medium 209. For example, the concentration and distribution of water in the hydrocarbon medium 209 may change over time. This may result in changes to the electromagnetic properties of the load 208 and, in turn, the input impedance of load 208.

The impedance of the load 208 can also vary based on the amplitude of the excitation signal produced by the generator 206. In some cases, the impedance of the load 208 may vary nonlinearly with respect to the amplitude of the excitation signal.

Figure 3B:
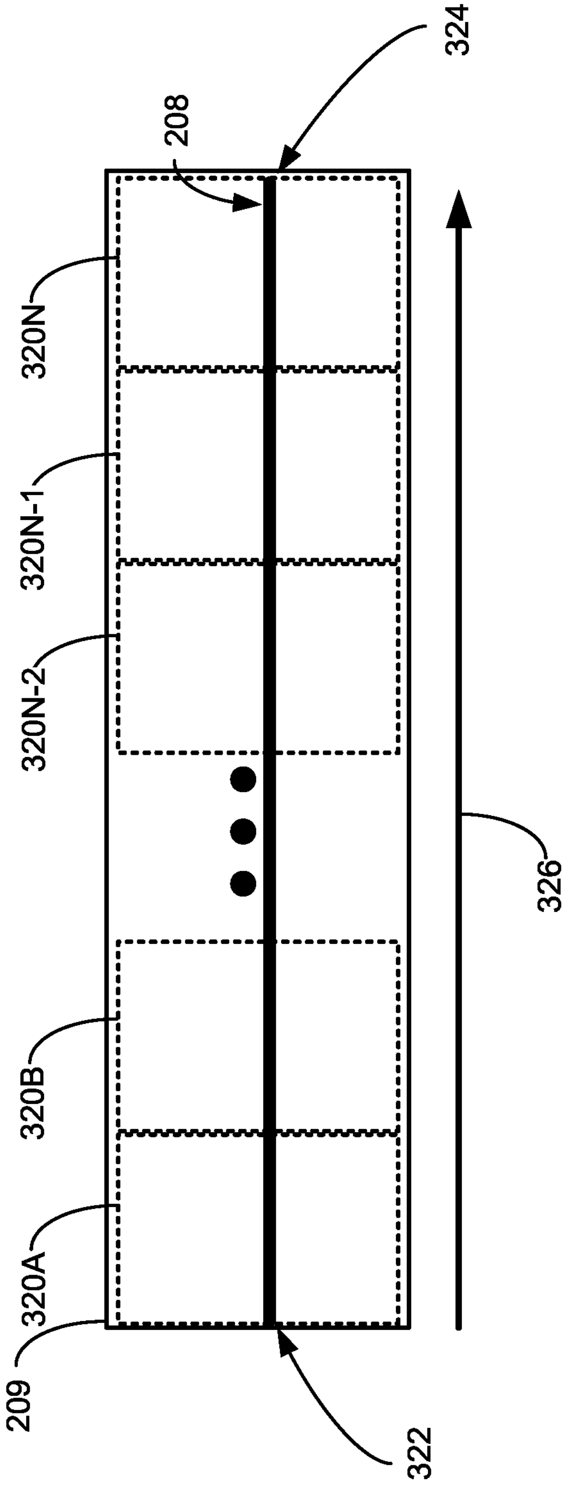
FIG. 3B is a schematic illustration of an example radiating structure model that may be used with the system of FIG. 1 in accordance with an embodiment.

The load 208 can be implemented using a variety of geometries and various physical dimensions. As illustrated in FIGS. 3A and 3B, load 208 has a longitudinal axis, and the extent of the load 208 along the longitudinal axis can define the length of the load. In the example of FIG. 3B, the longitudinal axis extends in the longitudinal direction 326 between a proximal end 322 (proximate to the generator 206 and/or coupling member 207) and a distal end 324 (spaced apart from the generator 206 and coupling member 207). The length of the load 208 can be defined so that small changes in the power spectral density of output signals applied to the load 208 can result in large changes in the pattern of the produced standing electromagnetic wave.

In some embodiments, the load 208 can include an arrangement of multiple elements, such as a group of radiators. For example, the load 208 may include one or more radiating structures positioned in the hydrocarbon medium 209, such as radiating structures 208A-208C shown in the example of FIG. 3 and the transmission line conductors 112*a* and 112*b* shown in the example of FIG. 1. When output signals are applied to the radiating structures, a standing electromagnetic wave can be produced along a length of the radiating structures and electromagnetic energy is radiated into the hydrocarbon formation.

As shown in the example of FIG. 1, the radiating structures may include a plurality of transmission line conductors 112 including first transmission line conductor 112*a* and a second transmission line conductor 112*b*. The signal generator 206 may then generate a first output signal to be applied to the first transmission line conductor 112*a* and a second output signal to be applied to the second transmission line conductor 112*b*.

The second output signal may be a phase shifted version of the first output signal. That is, the second output signal may include the first output signal with the addition of a phase shift. For example, the second output signal can be the first output signal with a 180° phase shift. As a result, the first transmission line conductor and the second transmission line conductor can have electrically different lengths.

The load 208 can include various components (not shown) that can be configured to vary the standing electromagnetic waves produced along its length. For example, load 208 may include one or more generator signal excitation components that can be configured to modify the spatial frequency, voltage, current, power, phase, and/or other property of the standing electromagnetic waves. The load 208 may also include components (not shown) that can be configured to vary the load impedance (or resistance or reactance) of the load 208. In some cases, more than one configuration of the load 208 may result in the same standing electromagnetic waves and/or load impedance.

In some embodiments, the load 208 can include a sacrificial material. The sacrificial material may be applied to an outer surface of the load 208 to provide a sacrificial layer. The sacrificial layer can protect a conductive surface of the load 208 from damage caused by electrical arcing and/or corrosion. This may help maintain the electrical connection between the signal generator 206 and the load 208.

The controller 202 can control the various components of the electromagnetic heating control system 200, such as the signal generator 206 and the load 208. The controller 202 can determine control settings to be applied to one or both of the signal generator 206 and the load 208. For example, the controller 202 may control characteristics of the output signals (e.g., the power spectral density) generated by the signal generator 206. The controller 202 may adjust control settings of one or both of the signal generator 206 and the load 208 to define desired spatial heating profiles along the load 208. As used herein, the term control settings may also be understood to include configuration settings.

The controller 202 may be implemented using any suitable processor, controller or digital signal processor that provides sufficient processing power depending on the configuration, purposes and requirements of the electromagnetic heating control system 200. In some embodiments, the controller 202 can include more than one processor with each processor being configured to perform different dedicated tasks. The controller 202 may be implemented in software or hardware, or a combination of software and hardware. Although the controller 202 is shown as one component in FIG. 2A, in some embodiments, the controller 202 may be provided by one or more components distributed over a geographic area and connected via a network.

In some embodiments, the controller 202 may include a storage component (not shown). The storage component can include RAM, ROM, one or more hard drives, one or more flash drives or some other suitable data storage elements such as disk drives, etc. The storage component can store data in various databases or file systems. For example, the storage component may store data usable with a predictive model 204, a model parameter generator 216, a heating life-cycle sub-unit 230, a control setting generator 218 and/or various other components of system 200.

The controller 202 can transmit and receive data signals to and from other devices, including the various components of the electromagnetic heating control system 200. For example, the controller 202 may receive information regarding the hydrocarbon medium 209 from various system components such as data sources 212 and/or sensors 210. The control 202 may transmit control settings to various system components such as signal generator 206 and/or load 208.

As shown in the example of FIG. 2A, controller 202 may include a predictive model 204, a model parameter generator 216, and a control setting generator 218. It will be appreciated that these components are shown to illustrate example functionalities of the controller 202, and are not intended to be restrictive. In some embodiments, these components may implemented in different ways, including being combined into fewer components, or divided into additional components. Furthermore, the controller 202 may include additional components that are not shown in FIG. 2A, such as a life cycle sub-unit 230 (see e.g. FIGS. 2C and 2E) for example.

Figure 2C:
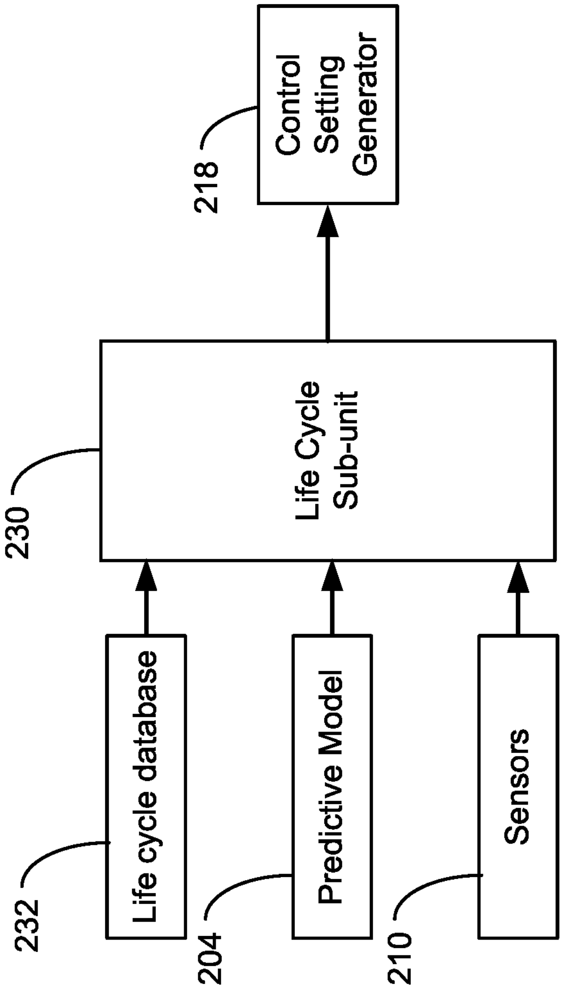
FIG. 2C is a block diagram of an example heating life cycle controller sub-unit that may be used with the system of FIG. 2A in accordance with an embodiment.

FIG. 2C illustrates an example of a life cycle sub-unit 230 that may be provided by controller 202 and/or an external processor coupled to controller 202. The life-cycle sub-unit 230 may be configured to define a desired heating life cycle for the system 200. The desired heating life cycle can be used to determine a desired operational state of the system 200. The desired operational state can be provided to the control setting generator 218 (see e.g. FIG. 2E). The desired operational state can be used by the control setting generator 218 to determine one or more desired signal generator control settings for the signal generator 208. The one or more desired signal generator control settings can be selected to provide the desired operational state.

The life-cycle sub-unit 230 can be configured to define a desired heating life cycle for the operational lifespan of the electromagnetic heating provided by system 200. The desired heating life-cycle may be defined based on characteristics of system 200, hydrocarbon medium 209, and the interaction between various components of system 200 and medium 209. The desired heating life-cycle can be defined to include various desired heating characteristics along the load corridor or radiating structure corridor such as a desired spatial heating profile. The desired heating characteristics such as the desired spatial heating profile can be used to determine a desired electromagnetic wave pattern to be generated in the corridor. The control setting generator 218 can then determine the desired signal generator control settings expected to provide the desired electromagnetic wave pattern.

The life cycle sub-unit 230 can be configured to determine a desired heating life cycle based on data from a plurality of data sources. As shown in the example of FIG. 2C, the life cycle sub-unit 230 can be coupled to data sources including a life cycle database 232, a predictive model 204, and one or more sensors 210. The life cycle sub-unit 230 can use the data received from the data sources in order to define the desired heating life cycle.

The production life cycle database 232 can be configured to include data related to an expected life cycle model. In some cases, the life cycle database 232 may include data related to the heating life cycle of hydrocarbon mediums or formations that have previously undergone electromagnetic heating. The life cycle database 232 can also include data related to the components of system 200, such as the known and/or expected characteristics of signal generator 206, coupling member 207, load 208, and hydrocarbon medium 209.

As described in further detail herein, predictive model 204 can be configured to determine a predicted/simulated behavior of the signal generator 206, the load 208, and/or the hydrocarbon medium 209 in response to an existing status (either expected or actual) of properties of the system 200. The life cycle sub-unit 230 may be configured to define an initial desired heating life cycle for the medium 209 using predictive model 204 with data from life cycle database 232.

The life cycle sub-unit 230 can also be configured to adapt/update the desired heating life cycle based on feedback from components of system 200, such as sensors 210 and/or generator 208. For example, feedback from the sensors 210 may indicate that the actual or current heating profile in the corridor differs from the initial desired heating life cycle for the medium 209. Accordingly, the life cycle sub-unit 230 can be configured to update the desired heating life cycle to account for these differences. The updated desired heating life cycle may be defined in a similar manner to the initial desired heating cycle. As with the initial desired heating life cycle, the updated desired heating life cycle can be defined to provide an optimized sequence of heating profiles based on the actual status of medium 209 and/or system 200 and/or a predicted status generated by predictive model 204. The desired heating life cycle may be defined to maximize the efficiency of the reservoir heating, and associated hydrocarbon extraction, within the operational constraints of system 200. The updated desired heating life cycle may then be provided to control setting generator 218 to be used in determining control settings for signal generator 206.

The control settings can then be applied to signal generator 206 in order to define the excitation signal produced. This excitation signal can then be applied to the load 208 in order to generate an electromagnetic wave within the corridor. As a result, the updated control settings can cause changes in the predictive model 204 for the medium 209 and the system 200 as a whole. The change in the electromagnetic wave can also be identified through feedback from sensors 210 monitoring the medium 209 and/or components of system 200 such as the signal generator 206. This feedback can be provided to the life cycle sub-unit 230 to further update the desired heating life cycle as required.

Referring again to FIG. 2A, the predictive model 204 may provide a representation of at least some of the components of the electromagnetic heating control system 200. For example, the predictive model 204 can be used to determine a predicted/simulated behavior of the signal generator 206, the load 208, and/or the hydrocarbon medium 209 in response to an existing status (either expected or actual) of the system 200.

The predictive model 204 can be used to simulate interactions between the various components of system 200. The predictive model 204 may determine expected electromagnetic, thermal, fluid, or structural properties of system 200. For example, the predictive model 204 may determine expected electromagnetic standing waves generated by the load 208, the temperature profile of the hydrocarbon medium 209, and the flow of water or hydrocarbons within the hydrocarbon medium 209 based on an existing status of the system 200 and/or the control settings of system 200.

In general, predictive model 204 can be used to predict the status of various properties of the electromagnetic heating control system 200 based on model parameters. The model parameters can be inputs to the predictive model 204, which are used by the predictive model 204 to simulate a current operational status of the parameters of the system 200.

Some of the model parameters may reflect observable/measurable properties of the hydrocarbon medium, the load, and/or the signal generator. For example, the relative permittivity (or dielectric constant) of the hydrocarbon medium 209 may be used as a model parameter. Other examples of model parameters can include one or more of the temperature, pressure, water concentration, current, voltage, impedance, and frequency of one or more of the hydrocarbon medium, the load, and the signal generator.

In some cases, the actual status of the model parameters corresponding to observable/measurable properties may be determined using measured data from the data sources 212 or the sensors 210. This may allow the predictive model 204 to determine the current operational status of the system 200 using the actual characteristics of the system 200 at the present time.

The predictive model 204 may also use an expected status of one or more model parameters to determine the current operational status of the system. In some cases, the expected status of one or more model parameters can be determined by the model parameter generator 216. The expected status of a model parameter may be used, for example, where the actual status is not currently available, e.g. due to the unavailability of the actual status or the intermittent availability of the actual status.

In some cases, some model parameters may be difficult, impractical, or even impossible to directly observe. For example, it may be impractical to directly measure certain properties of particular regions of the hydrocarbon medium 209 because they are positioned deep underground, far away from the surface. Furthermore, in some cases, sensors 210 may be expensive or fragile to install. In such cases, the predictive model 204 may rely on an expected status of these properties in determining the current operational status of the system 200. The predictive model 204 may also use available observable data that can be used to infer the current operational status of the system 200. In some cases, the predictive model 204 may update the expected status to account for the complete set of past and current observables measured in a Bayesian probabilistic sense.

In some cases, the predictive model 204 may be implemented using a simplified model of the load 208 and its electromagnetic interaction with the hydrocarbon medium 209. This may reduce the number of model parameters required and/or reduce the computational intensity of the predictive model 204.

Alternately, the predictive model may be defined to use a more complex model of the system 200. A more complex model may include additional system characteristics such as configuration properties of the load 208, dielectric properties of the hydrocarbon medium 209, temperatures along the load 208, concentrations of water and hydrocarbon in the hydrocarbon medium 209, a likelihood of electrical arcing and so forth. This may allow the model 204 to provide a more accurate representation of the electromagnetic heating control system 200, which may promote more refined control.

The predictive model 204 may include a wave model of the electromagnetic standing wave generated by the load 208. The modeled electromagnetic standing wave can be used to determine temperatures of the hydrocarbon medium 209. This may also allow the predictive model to estimate the flow of water and hydrocarbons within the hydrocarbon medium 209.

In some embodiments, the predictive model 204 may model the electromagnetic standing wave based on the propagation of the output signals along the load 208 and the resultant electromagnetic fields. In some cases, the output signals may be modeled as propagating in approximately transverse electromagnetic mode (TEM). For example, the output signals may include a lossy guided electromagnetic propagating mode that may be approximately represented as transverse electromagnetic mode. That is, the output signals can be modeled as having an electromagnetic field pattern that is approximately perpendicular or transverse to the direction of propagation. This approach may be suitable where the separation distances between radiating structures of the load 208 do not abruptly change, and where the wavelengths of the output signals are significantly longer than the transverse dimensions of the load 208. Modeling the propagation of the output signals as being substantially TEM may reduce the computational complexity of the predictive model 204 and may reduce the number of model parameters. In some embodiments, the output signals may also be modeled as having an exponential decay along the load 208. The exponential decay may represent conductor losses of the load 208 and dielectric losses of the hydrocarbon medium 209.

Figure 8A:
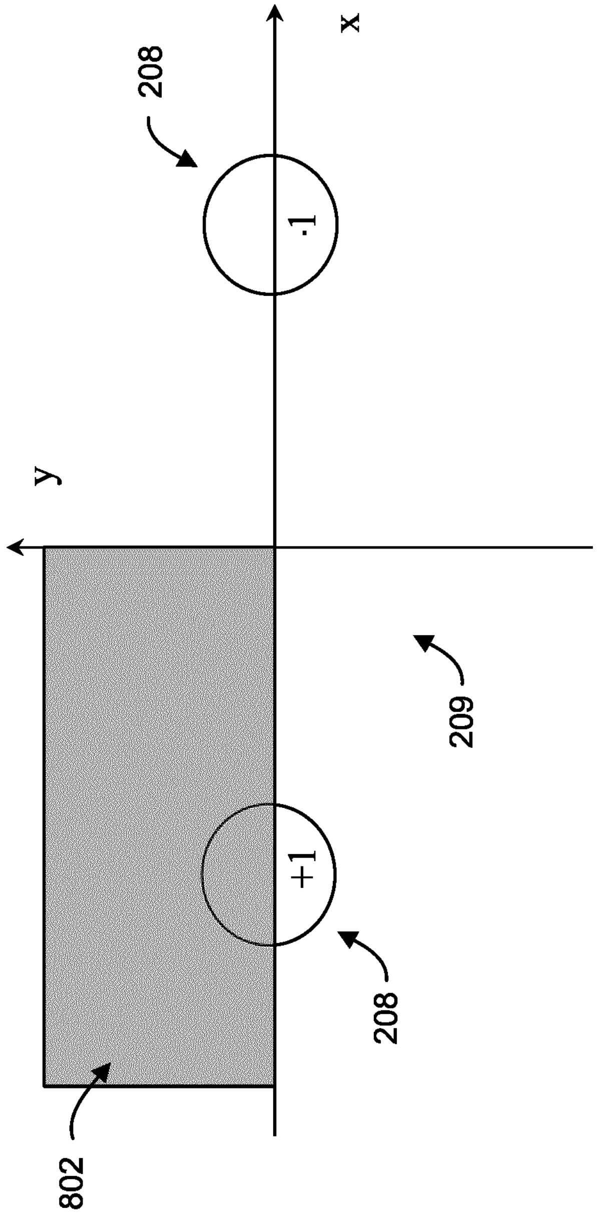
FIGS. 8A and 8B are illustrations of example models for an electromagnetic heating apparatus in accordance with an embodiment.

A number of different modeling techniques may be used to implement the predictive model 204. FIG. 8A illustrates a simplified example of the predictive model 204 in which the load 208 may be treated as a pair of parallel cylindrical pipes positioned with the hydrocarbon medium 209. This example implementation of predictive model 204 may consider a portion of the load 208 and the hydrocarbon medium 209, due to their symmetry, to reduce computational complexity. For example, the predictive model 204 may only consider a quarter 802 of a cross-section of the load 208 and the hydrocarbon medium 209

The predictive model 204 may assume approximately transverse electromagnetic mode of transmission (TEM) and hence model the electromagnetic standing waves based on Laplace's equation: $\nabla^2\phi(x,y)=0$, where $\phi$ represents the electric potential in a transverse plane of the radiating structure of 112. For example, the predictive model 204 may seta boundary condition $\phi(x,y)=1$ at the surface of one pipe, and $\phi(x,y)=-1$ at the surface of the other pipe. The predictive model 204 can further can set x=0 as an equipotential surface, and y=0 as a Neumann condition. Alternatively, more accurate models can be developed assuming the presence of all 6 spatial components of electromagnetic fields (full wave). However, there are various other models of the electromagnetic propagation which may be better suited depending on the electromagnetic properties of the hydrocarbon medium corridor. For instance, the diffusion of water around 112 will have a significant impact on the electromagnetic wave field structure that may not be well approximated by the TEM.

The predictive model 204 may incorporate a number of assumptions or estimates regarding the nature of the hydrocarbon medium 209. For example, the predictive model 204 may be defined to model the hydrocarbon medium 209 with no free charge within the hydrocarbon medium 209, such that $\nabla E=0$. Additionally or alternatively, the predictive model 204 may be defined to model the hydrocarbon medium 209 as being homogenous, isotropic, and linear, such that $D=\varepsilon E$. Additionally or alternatively, the predictive model 204 may be defined to model the hydrocarbon medium 209 with a non-zero current, but with no accumulated charge in the hydrocarbon medium 209. Additionally or alternatively, the predictive model 204 may be defined to model the hydrocarbon medium 209 to have no time variation. Additionally or alternatively, the predictive model 204 may be defined to model the hydrocarbon medium 209 such that the electric field (E-field) and magnetic field (H-field) are not coupled.

The predictive model 204 may be configured to determine the electric field and the magnetic field within the hydrocarbon medium 209. For example, the predictive model 204 may determine the electric potential, $\phi(x,y)$, and then determine the electric field, $E=-\nabla\phi(x,y)$; the current flow, $J=\sigma E=-\sigma\nabla\phi(x,y)$; and the magnetic field, $V\times H=J$.

In some cases, the predictive model may be defined to model the hydrocarbon medium 209 to be time variant. The predictive model 204 may then be implemented using time variant equations for the magnetic and electric fields, such as $$\nabla\times H=J+\varepsilon\frac{dE}{dt}$$

and $$\nabla\times E=-\mu\frac{dH}{dt},$$

and the E and H fields may be coupled.

If the output signals are TEM, the E and H transverse fields are the same as the static solutions (i.e. the same as the time invariant model) the E and H field components are proportional with a constant of the mode impedance, and the electric potential $\phi(x,y)$ can still be used.

FIG. 8A illustrates a simplified example of the predictive model 204 in which the regions of the hydrocarbon medium 209 near the load 208 are modelled as an inner dry region 209A and an outer wet region 209B. The dry region 209A may be modelled as a dielectric layer. This may result in the model including a boundary region of bound charge, where $\nabla^2E\neq0$, which can result in a non-TEM standing electromagnetic wave. The predictive model 204 may model the dry region 209A to have a radius that increases over time.

The predictive model 204 may assume that the electric field is symmetrical and orthogonal to the surface of the load 208.

The model 204 may define the boundary between the dry region 209A and the wet region 209B as an equipotential surface.

The model 204 may define the inner region 209A as a coaxial cable. The coaxial cable may have a capacitance per unit length, $$c=\frac{2\pi\varepsilon}{\ln\left(\frac{b}{r_p}\right)},$$

where $r_p$ is me pipe radius and b is the dielectric boundary radius. The capacitance per unit length of the load 208 can be determined as, $$C=\frac{1.36\varepsilon}{\log_{10}\left(\left(\frac{h}{b}\right)+\sqrt{\left(\frac{h}{b}\right)^2-1}\right)}$$

and the conductance can be determined as, $$G=\frac{1.36\rho}{\log_{10}\left(\left(\frac{h}{b}\right)+\sqrt{\left(\frac{h}{b}\right)^2-1}\right)},$$

where 2 h is the distance between the two pipes.

Figure 8B:
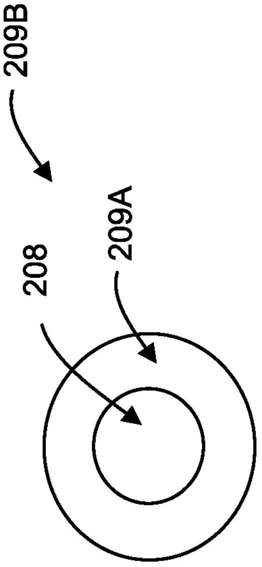
Figure 9A:
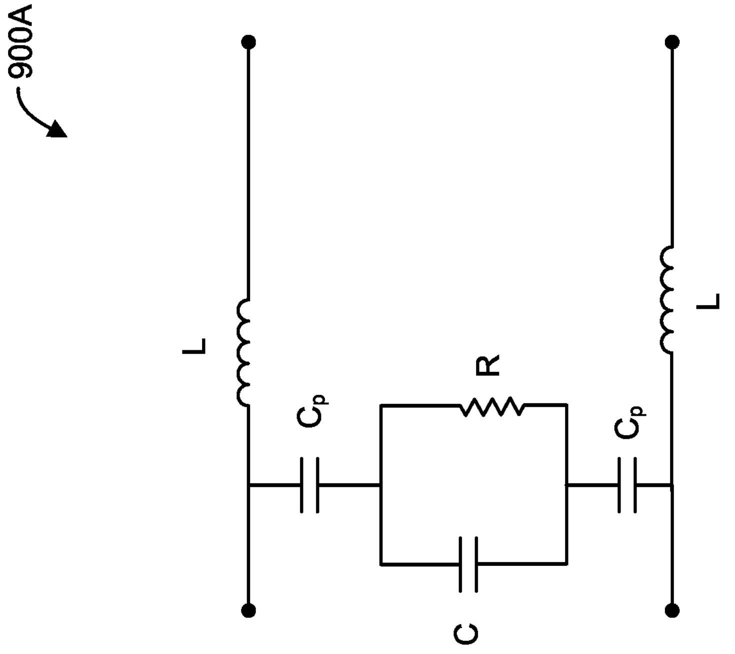
FIGS. 9A and 9B are schematic diagrams of example equivalent circuits for an electromagnetic heating apparatus in accordance with an embodiment.
Figure 9B:
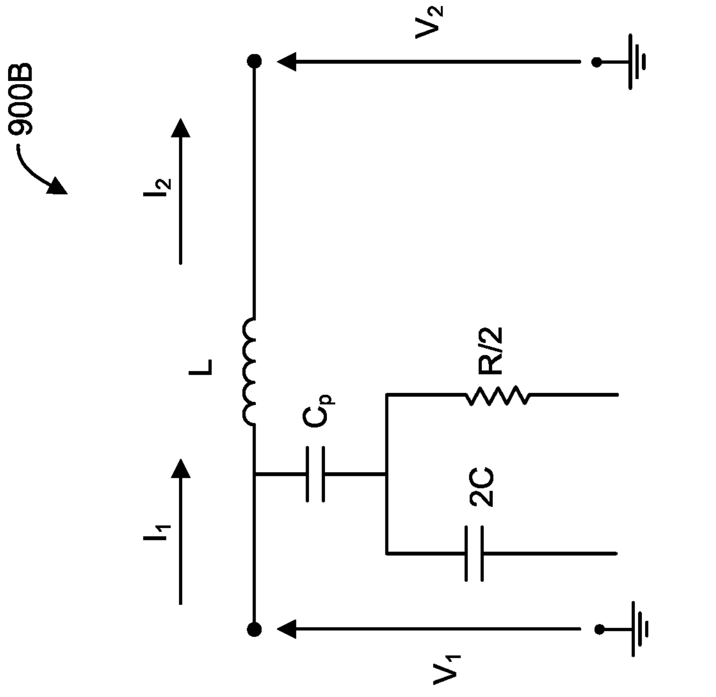

FIG. 9A illustrates an example of an equivalent circuit 900A that may be used with the predictive model shown in FIG. 8B. In the equivalent circuit 900A, $C_p$ may correspond to the dry region 209A and C and R may correspond to the wet region 209B. FIG. 9B illustrates an example of a simplified equivalent model 900B that may be determined from the equivalent circuit 900A.

The simplified model 900B may be defined according to $$\begin{bmatrix} V_1 \\ I_1 \end{bmatrix} = \begin{bmatrix} a & b \\ c & d \end{bmatrix} \begin{bmatrix} V_2 \\ I_2 \end{bmatrix},$$

where $$a = 1,$$

$$b = sL,$$

$$c = \frac{1}{z},$$

$$d = \frac{sL}{z} + 1,$$

and $$z = \frac{1}{sC_p} + \frac{R/2}{RCs + 1}.$$

It can be determined that $$c = \frac{1}{\sqrt{\varepsilon_0 \mu_0}},$$

$$c = \frac{1}{\sqrt{2C_0 L}},$$

where $$C_0 = \frac{1.36\varepsilon_0}{\log_{10}\left(\left(\frac{h}{r_p}\right) + \sqrt{\left(\frac{h}{r_p}\right)^2 - 1}\right)},$$

and $$L = \frac{1}{c^2 2C_0}.$$

The model can be defined to assume that the end of the radiating structure conductor 112, has a relatively high impedance, and the model can thus estimate the current and voltage at the end of the radiating structure conductor to be:

$$\begin{bmatrix} V_{end} \\ I_{end} \end{bmatrix} = \begin{bmatrix} 1 \\ 0 \end{bmatrix}$$

The model can be defined to determine the voltage and current at a distance of one meter from the end of the pipe using:

$$\begin{bmatrix} V_1 \\ I_2 \end{bmatrix} = \begin{bmatrix} a & b \\ c & d \end{bmatrix} \begin{bmatrix} V_{end} \\ I_{end} \end{bmatrix},$$

and to determine the voltage and current n meters from the end of the pipe recursively using:

$$\begin{bmatrix} V_n \\ I_n \end{bmatrix} = \begin{bmatrix} a & b \\ c & d \end{bmatrix} \begin{bmatrix} V_{n-1} \\ I_{n-1} \end{bmatrix}.$$

The predictive model 204 can determine the value of one or more model parameters based on equivalent circuit component values using various analytic techniques, such as finite element analysis for example. Examples of model parameters that may be determined by the predictive model can include electric potential, $\phi(x,y)$, field energy $E_e$, capacitance C, where $$E_e = \frac{1}{2}CV^2,$$

and V represents voltage, inductance $$L = \frac{\varepsilon_e}{Cc^2},$$

lossless characteristic impedance $$Z_{TEM} = \sqrt{\frac{L_{TEM}}{C_{TEM}}},$$

shunt conductance (e.g. based on the shunt current), shunt current (e.g. based on the electrical field and current density, $J_c = \sigma E$ and $J_d = \omega \varepsilon_0 \varepsilon_r E$), propagation constant $\gamma = \sqrt{(R + j\omega L_{TEM})(G + j\omega C_{TEM})}$. In some embodiments, the model 204 may consider R to be negligible (e.g. where the load 208 is cladded) and the propagation constant can be determined according to $\gamma = \sqrt{j\omega L_{TEM}(G + j\omega C_{TEM})}$ with $\gamma = \alpha + j\beta$.

Referring again to FIG. 2A, the predictive model 204 can also include a medium heat transfer model representing an estimation of heat transfer within the hydrocarbon medium 209. The medium heat transfer model may include multiple different mechanisms of heat transfer in the hydrocarbon medium 209.

For example, the medium heat transfer model can include a first heat transfer model and a second heat transfer model. The first heat transfer model may represent an approximation of heat transfer within the hydrocarbon medium 209 when there is a high concentration of water in regions of the hydrocarbon medium 209 near the load 208. The first heat transfer model may reflect heat transfer that is caused primarily by conductive currents, resulting in free electron motion. In the first heat transfer model, the heat transferred may be proportional to the square magnitude of the electrical field.

The second heat transfer model may represent an approximation of heat transfer within the hydrocarbon medium 209 when there is a low water concentration in regions of the hydrocarbon medium 209 near the load 208. The second heat transfer model may reflect heat transfer that is caused primarily by the movement of bound charges caused by a changing electrical field. In the second heat transfer model, the heat transferred may depend on the frequency of the electromagnetic standing waves generated by the system 100.

The model parameter generator 216 can be used to determine the status/value of model parameters that may be used by the predictive model 204. In some embodiments, the model parameter generator 216 may determine the actual status of the model parameters used by the predictive model 204. For example, the model parameter generator may receive a measured value of the status of a model parameter from data sources 212 and/or sensors 210.

In some cases, each model parameter may be linked with at least one observable/measurable data reference. Accordingly, the status of that parameter in the model may be updated in a Bayesian sense.

For example, the model parameter may be a temperature value. The model parameter generator 216 may receive a measured temperature signal from a temperature sensor 210 representing the actual status of the temperature as it was measured by the sensor. The model parameter generator 216 may then use the actual status of the model parameter in the predictive model 204.

In some embodiments, the model parameters may be determined by the model parameter generator 216 based on data received from the data sources 212 or the sensors 210. For example, the model parameter generator 216 may determine the value of a model parameter based on the measured status of a related model parameter (e.g. determining the current based on a measured voltage across a known/estimated resistive value).

In some embodiments, the model parameter generator 216 may be configured to estimate the value of one or more model parameters. For example, the model parameter generator 216 may use a Bayesian tracking or expectation maximization technique to determine the status of one or more model parameters. Alternately or in addition, the model parameter generator 216 may use a Kalman filter technique to determine the status of one or more model parameters. Alternately or in addition, the model parameter generator 216 may use a machine learning model to determine the status of one or more model parameters. For example, an artificial neural network may be trained to generate an estimated status of one or more model parameters based on inputs from the data sources 212 and/or the sensors 210 and/or previous values determined by the predictive model 204 and/or model parameter generator 216.

Figure 2D:
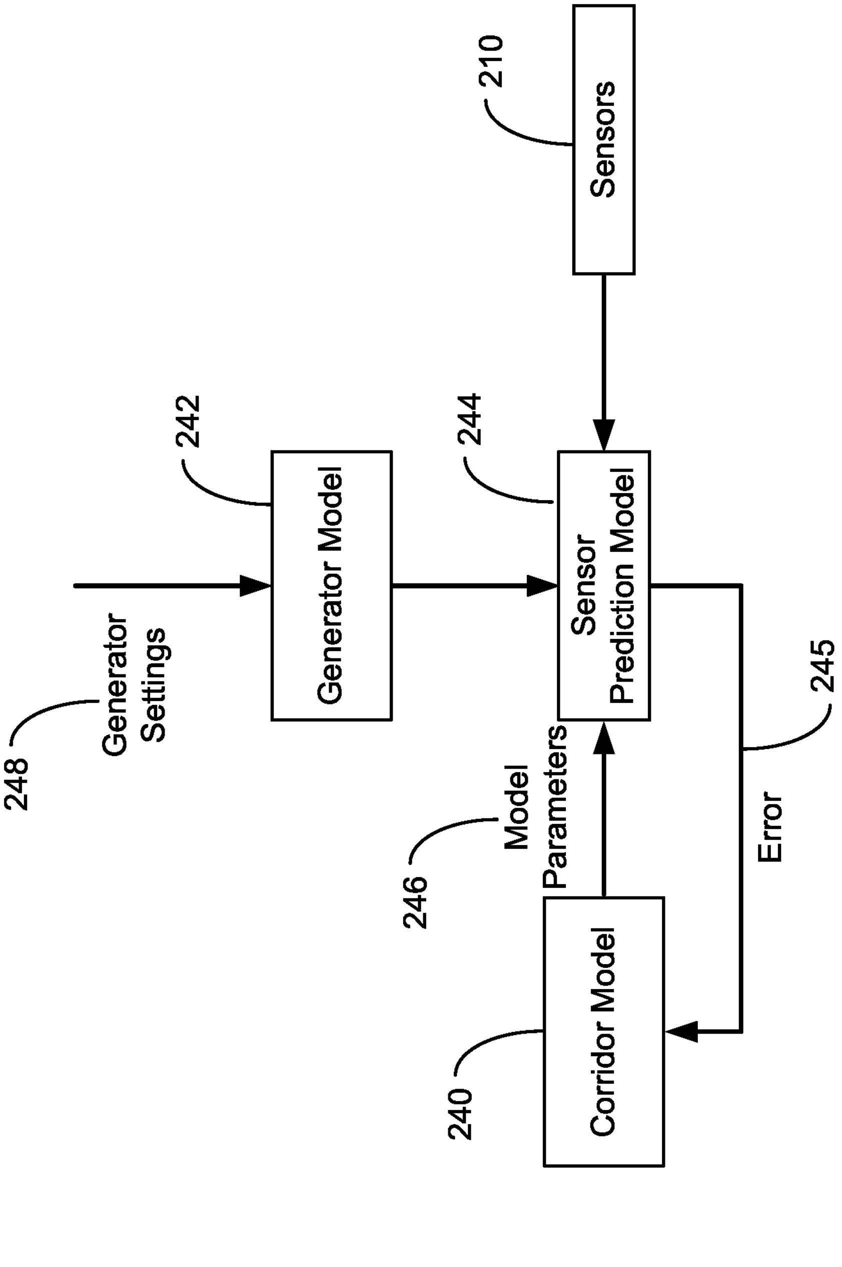
FIG. 2D is a block diagram of an example model parameter generator that may be used with the system of FIG. 2A in accordance with an embodiment.

Referring now to FIG. 2D, shown therein is a block diagram of an example process for generating model parameters. The example process for generating model parameters shown in FIG. 2D is an example of a process that may be implemented by the model parameter generator 216. The process shown in FIG. 2D can be used to generate updated model parameters that can be used by the predictive model 204 to evaluate how changes to the control settings may impact the system 200 and in particular the heating profile within medium 209.

As shown in FIG. 2D, the model parameter generator 216 can be configured to implement a plurality of sub-models. As shown in the example of FIG. 2D, the model parameter generator can incorporate a corridor model 240, a generator model 242, and a sensor prediction model 244.

In some examples, corridor model 240 can be defined using a predictive parameterized model of the radiating structure corridor. The radiating structure corridor may be defined as a cylindrical region surrounding the conductors of the load 208 (e.g. radiating structures 208A-208C). The boundaries of the cylindrical region can be defined to include the portion of the medium 209 that is influenced by electromagnetic heating resulting from the excitation signal applied to load 208 from the generator 206. The corridor model 240 can be defined to represent the electromagnetic properties of the hydrocarbon medium 209 within the radiating structure corridor that is affected by the electromagnetic heating caused by excitation of the load 208.

In some cases, the corridor model 240 may be defined using structural approximations of the radiating structure corridor. The corridor model 240 can be defined to represent electromagnetic propagation along the radiating structure (e.g. load 208) using a plurality of propagation sub-models. The corridor model 240 can be defined to also represent the water, steam flow and temperature profile along the radiating structure that may change with time.

FIG. 3B illustrates an example corridor model that is defined using two propagation sub-models. The corridor model illustrated in FIG. 3B may be used, for example, to implement the corridor model 240 shown in FIGS. 2D and 2E. A first propagation sub-model can be defined as a transverse propagation model. A second propagation sub-model can be defined as a longitudinal propagation model. The corridor model can then be defined as a product of the transverse propagation model and the longitudinal propagation model.

As shown in FIG. 3B, the corridor within the medium 209 can be divided into a plurality of longitudinal slices or sections 320A-320N. Each longitudinal section 320 may be defined to include a specified length of the corridor in the longitudinal direction 326. The specified length for each section 320 may be defined to be significantly smaller than the wavelength of the highest frequency component of the power spectral density achievable by generator 206. For example, each section 320 may be several meters in length in the longitudinal direction 326.

The transverse propagation sub-model can be configured to be applied to each longitudinal section. That is, each longitudinal section may be individually modelled using the transverse propagation sub-model. The transverse model can be configured to estimate the status of material properties of the hydrocarbon medium 209 that affect the dielectric properties. The transverse propagation sub-model in each section can provide an estimated status of electromagnetic properties of each longitudinal section such as water concentration, water vapor creation, water vapor condensation, heat flow, and hydrocarbon concentration for example. The estimated status of the material properties can then be used to estimate the average value of the medium dielectric for each section. The average dielectric value for each section can then be used to determine the overall section dielectric property and mode impedance.

The longitudinal sub-model can be configured to represent the transmission line mode and longitudinal standing wave pattern generated by the load 208. The longitudinal sub-model can be defined to provide a representation of the standing wave pattern for the entire load 208, based on the estimated status of properties determined by the transverse propagation sub-model. The longitudinal model can be configured to determine the longitudinal mode and power dissipation in each section 320, based on the status of the dielectric properties determined by the transverse sub-model. The determined dissipation can then be used to update the status of the enthalpy and hence temperature in each section 320.

The transverse propagation sub-model and longitudinal sub-model can be configured to operate iteratively. The outputs from the transverse propagation sub-model can be used to update the longitudinal sub-model. Similarly, the outputs from the longitudinal sub-model can be used to update the transverse propagation sub-model.

The corridor model 240 can output the estimated status of the various properties as model parameters 246. The model parameters 246 can be provided to the sensor prediction model 244 for use in estimating the status of various properties of the signal generator 206, the load 208, and/or the hydrocarbon medium 209.

The generator model 242 can be configured to estimate the properties of the excitation signal produced by generator 206 in response to the generator control settings 248 provided by the control setting generator 218. The generator model 242 can be configured based on the characteristics of the generator 206 as well as models of expected changes in generator operations over time (e.g. changes expected due to wear and tear on the generator 206). The generator model 242 can generate an estimated excitation signals that can be provided to the sensor prediction model 244.

The sensor prediction model 244 can be configured to estimate the status of various measurable properties of the signal generator 206, the load 208, and/or the hydrocarbon medium 209 in response to the current state of the system 200 (based on the model parameters 246) and the estimated excitation signal received from generator model 242. The sensor prediction model 244 can be configured to predict the status of sensed properties that may be collected by sensors 210 as well as properties derivable from the sensor data.

As shown in FIG. 2D, the sensor prediction model 244 can be coupled to the sensors 210. The predicted status of the one or more properties can be compared to actual or measured status received from sensors 210. The sensor prediction model 244 can then generate one or more error values 245 representing the difference between the predicted status of the one or more properties and the actual status of the one or more properties. The error value(s) 245 can be provided to corridor model 240. Corridor model 240 can use the error value(s) 245 to update the corridor model 240 to account for the differences between the predicted and actual status of the signal generator 206, the load 208, and/or the hydrocarbon medium 209. The error value(s) 245 and/or measured status of one or more properties can also be provided to the corridor model 240 in order to update the model parameters 246 based on the actual measured status of the properties of the signal generator 206, the load 208, and/or the hydrocarbon medium 209. The model parameters 246 generated by the corridor model 240 can be used to further determine any adjustments that may be necessary to the heating profile within the medium 209 (e.g. to update the desired heating life cycle), and in turn the necessary modifications to the excitation signal generated by generator 206.

The control setting generator 218 can be configured to determine and apply control settings to various components of the electromagnetic heating control system 200. The control setting generator 218 can determine the control settings to be applied based on expected operational responses determined by the predictive model 204.

For example, the predictive model 204 may predict the effect and desirability of particular control settings. The control setting generator 218 may use the predicted results of multiple different possible control settings to select a particularly optimized set of control settings.

Figure 2E:
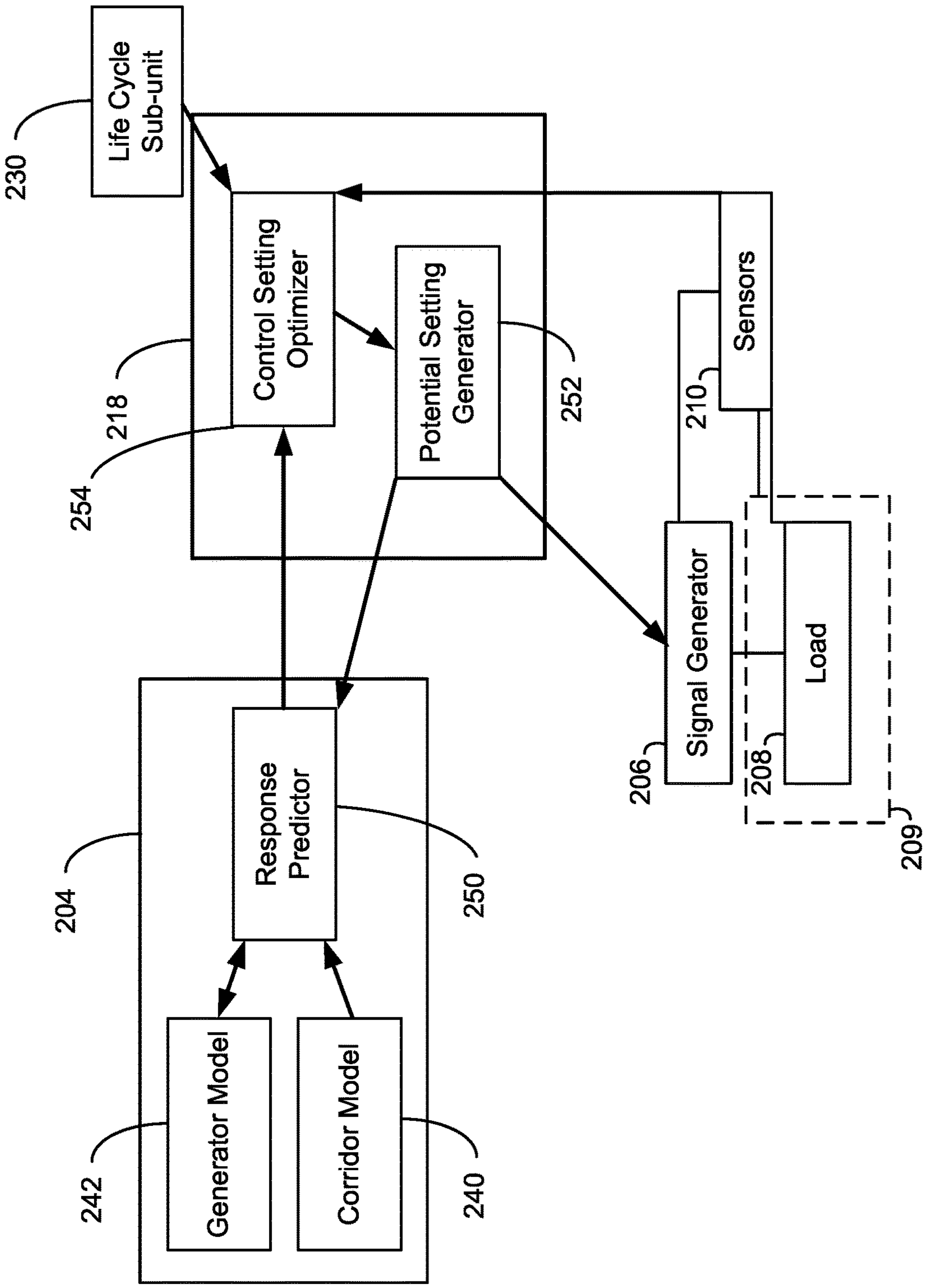
FIG. 2E is a block diagram of an example control setting generator that may be used with the system of FIG. 2A in accordance with an embodiment.

The control setting generator 218 and predictive model 204 may apply a constrained optimization to determine the control settings. An example block diagram of an overall process for determining the signal generator control settings is shown in FIG. 2E. The setting determination process illustrated in FIG. 2E may be implemented by various components of system 200, such as controller 202 and sensors 210. As shown in FIG. 2E, components of system 200 such as the predictive model 204 and control setting generator 218 can be configured to perform an iterative process to optimize the operational state of the system 200.

As shown in FIG. 2E, the predictive model 204 can be configured to include a corridor model 240, generator model 242 and response predictor model 250. Although shown as separate components, it should be understood that corridor model 240, generator model 242 and response predictor model 250 may be provided as separate components or as an integrated predictive model.

The predictive model 204 can be configured to determine a predicted response of system 200 based on a potential set of signal generator control settings received from control setting generator 218. The potential set of signal generator control settings may be defined based on a potential operational state. The potential set of signal generator control settings can be provided to the generator model 242. The generator model 242 can then determine estimated properties of the excitation signal produced by generator 206 and applied to load 208 in response to the generator control settings 248 provided by the control setting generator 218.

The generator model 242 can provide the estimated excitation signal properties to the response predictor model 250. The response predictor model 250 can also receive model parameters 246 from the corridor model 240. The model parameters 246 may be generated using a model parameter generation process such as that shown in FIG. 2D and described herein. The response predictor model 250 can be configured to determine a predicted response of the system 200 and medium 209 based on the estimated excitation signal properties and the received model parameters. The predicted response may include a predicted heating characteristics for the corridor around the load 208, such as a predicted spatial heating profile.

The control setting generator 218 can be configured to evaluate one or more potential sets of signal generator control settings to determine the signal generator control settings to apply to signal generator 206. As shown in the example of FIG. 2E, the control setting generator 218 can include a potential setting generator 252 and a control setting optimizer 254. The potential setting generator 252 can be configured to determine one or more potential sets of signal generator control settings that can be applied to signal generator 206. The potential sets of signal generator control settings may specify signal generator control settings such as power levels, signal frequency/frequencies, a possible sequence of state transitions etc. The potential sets of signal generator control settings may be determined based on constraints of the signal generator 206 (e.g. the different settings available) as well as additional constraints that may be defined for the controller 202, such as acceptable power levels for example.

The control setting optimizer 254 can be configured to evaluate a plurality of potential sets of signal generator control settings to identify the set of signal generator control settings to apply to signal generator 206. The control setting optimizer 254 can be configured to perform a constrained optimization of the fitness of the potential sets of signal generator control settings with the desired heating life cycle. As noted above, a predicted response of the generator and the radiating structure corridor can be determined by the predictive model 204 for each potential set of signal generator control settings defined by the potential setting generator 252.

The control setting optimizer 254 can be configured to determine a plurality of potential operational states based on the data received from predictive model 204. The control setting optimizer 254 may compare each potential operational states with the desired heating life cycle defined by life cycle sub-unit 230. The control setting optimizer 254 can be configured to evaluate a fitness of each potential operational state (and thus the corresponding set of signal generator control settings) with the desired heating life cycle. The control setting optimizer 254 can then identify the desired operational state (and in turn the corresponding desired signal generator control settings) as the potential operational state that maximizes the fit between the operational state and the desired heating life cycle.

The fit may be considered a generalized multi-component objective with a plurality of optimizable components. The heating life cycle may be considered a component of the production life cycle which can include any and all aspects of the process of extracting hydrocarbons from a hydrocarbon medium including the well planning, installation, heating, production and capping for example.

For example, the control setting optimizer 254 can be configured to determine a cost (e.g. a potential cost penalty) associated with each potential operational state. The cost may represent a difference or distance between the potential operational state and the operational state defined by the desired heating life cycle. The control setting optimizer 254 may determine a minimum cost operational state of the plurality of potential operational states by identifying the potential operational state associated with a lowest cost penalty of the plurality of cost penalties. The control setting optimizer 254 may then identify the minimum cost operational state as the desired operational state. The control setting optimizer 254 can then select the potential set of signal generator control settings corresponding to that operational state as the signal generator control settings to be applied to signal generator 206.

Various cost factors may be included in the optimization/cost minimization process performed by the control setting optimizer 254. For example, various cost factors such as energy loss, energy efficiency, overall power dissipation, generator power loss, high voltage risk, high current risk, overheating risk, soft switching performance and so forth. The control setting optimizer 254 can be configured to weigh the various factors for each potential operational state to determine the operational state provided the maximum fit with the desired heating life cycle while satisfying operational constraints of the generator 206 and system 200 as a whole.

Referring back to FIG. 2A, control setting generator 218 may use a machine learning model (that can be defined with one or more constrained parameters) to determine desired control settings. For example, an artificial neural network may be trained to generate control settings based on particular inputs, such as predictions from the predictive model 204, and/or input data from the data sources 212 and/or sensors 210.

Optionally, the controller 202 may evaluate the reliability of model parameters generated by the model parameter generator 216. The reliability may represent an evaluation of the accuracy of the model parameters generated by the model parameter generator 216.

Optionally, the controller 202 may evaluate the level of influence a given model parameter has on the control settings generated by the control setting generator 218. The level of influence for a particular model parameter may represent an evaluation of how dependent the control settings are on variations within that particular model parameter.

Optionally, the controller 202 may evaluate the risk of a particular control setting based on one or more model parameters used to determine the control setting. The risk may be determined based on a combination of the reliability and the level of influence of the given model parameter.

The sensors 210 may be configured to measure the values of one or more properties of various components of the electromagnetic heating control system 200. The sensors 210 may be configured to measure properties of one or more of the signal generator 206, the load 208, and/or the hydrocarbon medium 209. Examples of the properties that may be measured by the sensors 210 can include temperature, pressure, water desiccation, water diffusion, current, voltage, impedance, and frequency. The sensors 210 can communicate with controller 202 to provide signals indicating the value/actual status of the measured property(ies).

The sensors 210 may include one or more sensors configured to measure specific properties (e.g. temperature, pressure, current, etc.). The sensors 210 may include a plurality of sensors positioned to measure the different properties. In some cases, the sensors 210 may also include a plurality of sensors positioned to measure the same property, but at different locations within the system (e.g. temperature sensors positioned at different locations within the hydrocarbon medium 209).

Sensors 210 may be integrated with components of the system 200, such as load 208. For example, temperature sensors may be integrated with the load 208.

For example, the temperature sensors may include optical fibers positioned within load 208. The optical fibers can be configured to measure temperatures along the load 208 using various techniques, such as relying on the Raman scattering effect. The optical fibers may be used to detect temperature spikes or hot spots indicative of electrical arcing.

The load 208 may include an outer casing and the optical fibers may be positioned inside the outer casing. Where the load 208 includes a plurality of radiators, the system 200 may include optical fibers positioned within all of the radiators. Alternately, optical fibers may be positioned within only a subset of the radiators. Alternate types of temperature sensors may also be used that may provide increased longevity or reduced cost as compared to optical fibers.

The sensors 210 may include acoustic sensors. For example, acoustic sensors may be positioned at the location of the coupling member 207.

Acoustic sensors may be used to determine the presence and/or location of electrical arcing. Electrical arcing can cause rapid changes in the temperature of the hydrocarbon medium 209, and these changes can cause acoustic vibrations in the load 208. The acoustic sensors can measure the acoustic vibrations to detect the presence of the electrical arcing.

The sensors 210, such as acoustic sensors, may operate in conjunction with the signal generator 206 to determine the position of electrical arcing. For example, following the detection of an arc condition, the signal generator 206 may be abruptly turned off (i.e. shut down) to stop the electrical arcing and the resultant acoustic vibrations. There may be a time delay between the shutoff of the signal generator 206 and the end of the acoustic vibrations detectable by the acoustic sensors (assuming the load 208 has sufficient length, typically greater than 10 m). The length of the time delay can be used to determine the approximate position of the electrical arcing.

In some cases, electrical arcing may occur at more than one location along the load 208. Deconvolution processing may then be used to isolate each position. The deconvolution processing may involve calculations based on the geometry and acoustic properties of the load 208.

The sensors 210 may include probe sensors installed within the hydrocarbon medium 209. This may allow the system to evaluate the status of properties of the hydrocarbon medium 209 at locations separated from the load 208 and/or signal generator 206. Alternately, probe sensors may be omitted, e.g. due to installation costs concerns and/or concerns regarding sensor fragility.

The sensors 210 may include extracted sample sensors configured to measure the properties of samples of the extracted hydrocarbons. This may provide a more controlled environment within which to measure properties of the hydrocarbons from the medium 209.

The sensors 210 can include current and/or voltage sensors positioned at one or more locations within the electromagnetic heating control system 200. The current/voltage sensors may be configured with a high sampling rate (e.g. 50 MHz). This may enable the sensors to measure a wide frequency bandwidth.

The voltage/current sensors can be positioned at a plurality of locations within the electromagnetic heating control system 200. The voltage and current measurements from the sensors in the system 200 can be used to determine power dissipation between the different locations within system 200. The voltage and current measurements can also be used to determine impedances within system 200.

The controller 202 may use various transforms (e.g. Fourier and inverse Fourier transforms) to convert the measured values of the current and/or voltage between time and frequency domains. This may allow the controller 202 to determine various time dependent or frequency dependent characteristics of the measured current and/or voltage.

The voltage and current measurements may be used to determine power spectral densities within system 200. The determined power spectral densities may be used to detect the presence of electrical arcing. For example, a pair of sensors (e.g. one current sensor, one voltage sensor) may be positioned at the signal generator 206 and another pair of sensors may be positioned at load 208. The measured values determined from the sensors at the signal generator 206 can be compared to the measured values determined from the sensors at the load 208 to determine the presence of electrical arcing.

Voltage and current sensors may be positioned at the output of the signal generator 206. Voltage and current sensors positioned at the output of the signal generator 206 can measure the signals applied by the signal generator 206 to the load 208. The controller 202 may use the measurements at the signal generator output to determine various characteristics of the load 208 (e.g. impedance) and/or the hydrocarbon medium 209 (e.g. water concentration, temperature, and/or pressure). The voltage and current sensors may be operated before, during, and/or after the heating of the hydrocarbon medium 209.

The system 200 may be configured to operate the signal generator 206 to evaluate various properties of the coupling member 207, load 208, and/or the hydrocarbon medium 209. The signal generator 206 can be configured to emit sensing signals. The sensing signals can be transmitted along the coupling member 207 and/or load 208. The sensing signals may be reflected at various locations along the coupling member 207 and/or load 208, and the reflected signals may return to the signal generator 206. Sensors positioned at the output of the signal generator 206 can be used to measure the voltage and/or current of the emitted signals and the reflected signals.

The sensing signals may be reflected by changes in impedance along the coupling member 207 or load 208. The reflected sensing signals can travel back toward the signal generator 206 and the properties of the reflected signals can be measured by the voltage and current sensors. The controller may then use the properties of the emitted signals, and the reflected signals, to determine various properties of the coupling member 207, the load 208, and/or the hydrocarbon medium 209.

The signal generator 206 may be configured to emit a plurality of sensing signals. The sensing signals may be emitted sequentially to allow changes in the system properties to be identified. The emitted sensing signals can be generated with a short signal duration (e.g., several microseconds). These sensing signals may facilitate the detection of rapidly changing properties. The sensing signals may be emitted on a continual (e.g. periodic) basis, to enable properties of system 200 to be monitored.

In general, the sensing signals can be produced as generator wavelets output by signal generator 206. Various configurations of sensing signals may be used. For example, the sensing signals may be emitted as one or more pulse signals. For example, a sequence of square waves may be used as the sensing signals. This may help emphasize the observable data related to various parameters of the load 208.

The signal generator 206 may emit a plurality of sensing signals to enable spatial resolution measurements to be performed. The plurality of sensing signals may include a set of orthogonal pulse signals, where each of the pulse signals in the set of orthogonal pulse signals is orthogonal with respect to one another. For example, a set of sensing signals generated using Walsh Hadamard functions (e.g. eight pulse signals) can be used complete a measurement sweep across a large frequency bandwidth.

FIGS. 5A-B and 6A-B illustrate various examples of how sensing signals may be applied in the system 200 to measure properties of system 200.

Figure 5A:
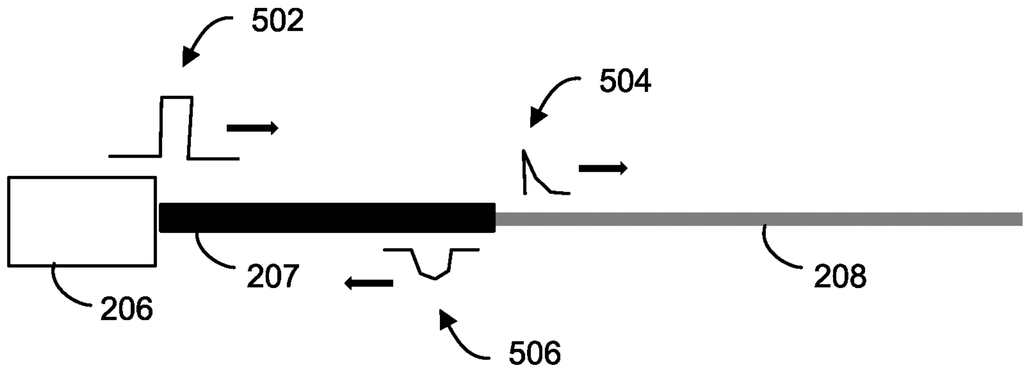
FIGS. 5A and 5B are illustrations of example sensing signal measurements in accordance with an embodiment.

FIG. 5A shows a schematic illustration of an example measurement process in which the signal generator 206 generates and applies a sensing signal 502 in the form of a pulse signal to the load 208 via the coupling member 207. When the sensing signal 502 reaches the boundary between the coupling member 207 and the load 208, a first portion 506 of the emitted sensing signal is reflected back toward the signal generator 206, while a second portion 504 of the emitted sensing signal continues to travel along the load 208. The reflected portion 506 can be measured by the voltage and current sensors at signal generator 206. The controller may then use the measurements of the reflected portion 506 to determine various properties of the transmitted portion 504, such as the impedance of the load 208.

Figure 5B:
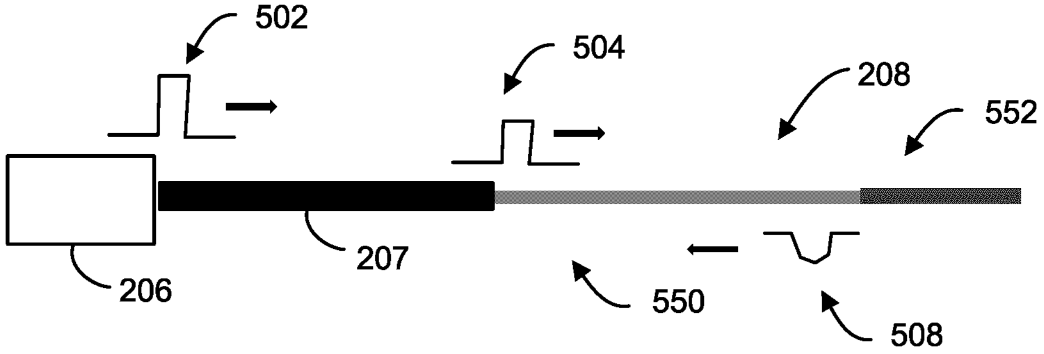

FIG. 5B shows a schematic illustration of another example measurement process in which the signal generator 206 generates and applies a sensing signal 502 to the load 208 via the coupling member 207. In some cases, the hydrocarbon formation may include regions with different levels of water concentrations and corresponding impedances. These regions may also vary, or depend, on the degree or phase of heating.

As shown in FIG. 5B, the formation 209 includes a first region 550 and a second region 552. In the example of FIG. 5B, the first region 550 has a high impedance (which may correspond to low water concentration) while the second region 552 has a low impedance (which may correspond to high water concentration). The transmitted sensing signal 504 can be reflected at the boundary between the high impedance region 550 and the low impedance region 552. This reflected portion 508 can propagate back toward the signal generator 206 and be measured by the current and voltage sensors. The measurements of the reflected portion 508 may be used to determine the location/extent of heating along the load 208.

Figure 6A:
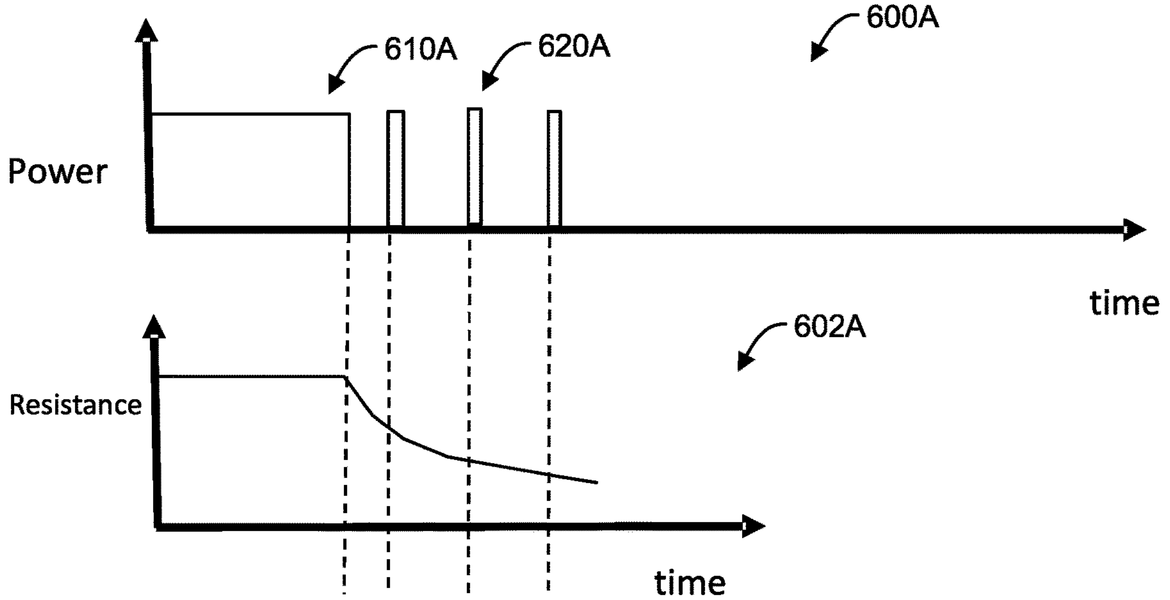
FIGS. 6A and 6B are illustrations of example sensing signal measurements in accordance with an embodiment.

FIG. 6A shows an example plot 600A of signals that may be emitted by the signal generator 206 along with a plot 602A representing the resistance of the hydrocarbon medium 209.

As shown in plot 600A, the signal generator 206 may emit an output signal 610A. The output signals 610A may be used to heat the hydrocarbon formations 209. The signal generator 206 may also emit sensing signals, in this case a plurality of pulse sensing signals 620A. As shown in FIG. 6A, the signal generator 206 may emit the pulse sensing signals 620A after stopping transmission of the output signal 610A.

While the output signal 610A is being applied to the load 208, the hydrocarbon medium 209 is being heated. When the output signal 610A is no longer applied, since the hydrocarbon medium 209 is no longer being heated the water concentration near the load 209 may increase, resulting in a decrease in resistance as shown in plot 602A. Reflected portions of the sensing signals 620A may be evaluated (e.g. voltage and current measured by sensors at the signal generator 206) and used to determine the change in the resistance over time. The change in resistance of time can be used to determine various properties of the hydrocarbon medium 209 e.g. properties related to the diffusion of water within hydrocarbon medium 209, such as a diffusion time constant.

Figure 6B:
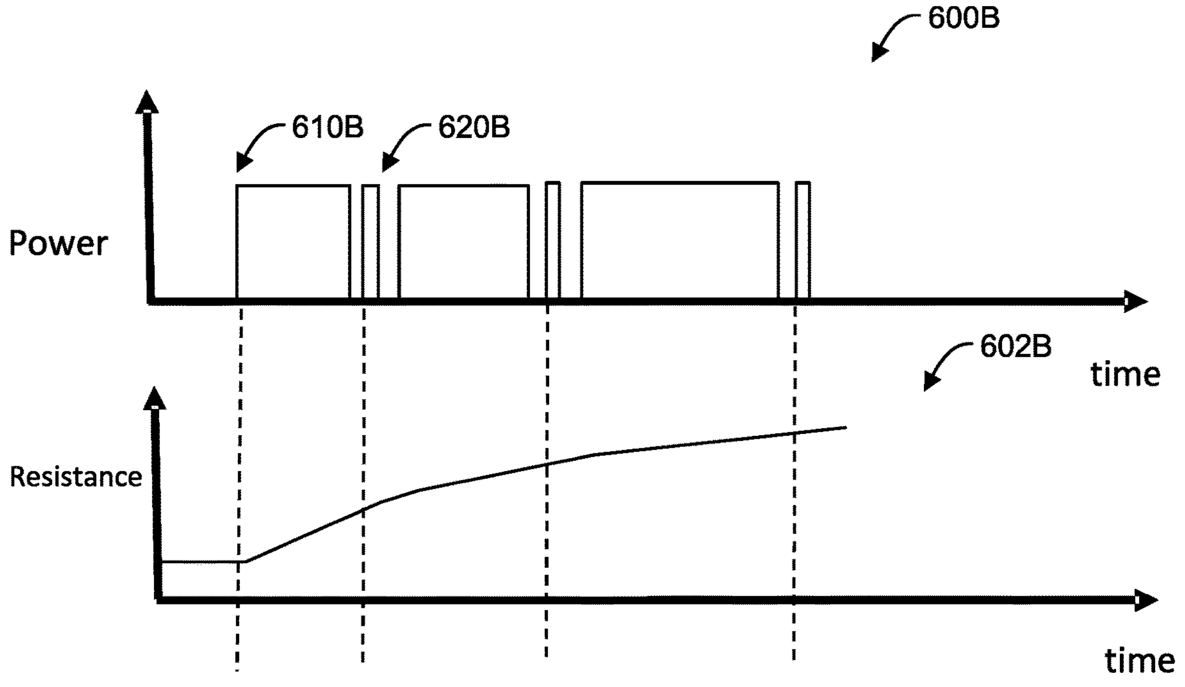

FIG. 6B shows an example plot 600B of signals that may be emitted by the signal generator 206 along with a plot 602B representing the resistance of the hydrocarbon medium 209.

As shown in plot 600B, the signal generator 206 may emit sensing signals 620B interspersed amongst output signals 610B intended for load heating. While the output signals are applied to the load 208, the hydrocarbon medium 209 is heated and the water concentration near the load 209 decreases, resulting in an increase in resistance. Reflected portions of the sensing signals 620B may be evaluated (e.g. voltage and current measured by sensors at the signal generator 206) and used to determine the change in the resistance over time. The change in resistance of time can be used to determine various properties of the hydrocarbon medium 209 during heating, e.g. properties related to the diffusion of water within hydrocarbon medium 209, such as a diffusion time constant.

Referring again to FIG. 2A, the data sources 212 may provide various types of data to the controller 202. The data can include information related to the load 208, the signal generator 206, and/or the hydrocarbon medium 209. For example, the data may include dielectric properties, chemical composition, water composition, etc. of the hydrocarbon medium 209. The data sources 212 may include measurements of drilling core samples from installation of the load 208, data related to other hydrocarbon mediums similar in structure or composition to the hydrocarbon medium 209, or general hydrocarbon reservoir data.

The data sources 212 may also include production configuration data. For example, the production configuration data may include a preferred heating or hydrocarbon production strategy.

The electromagnetic heating control system 200 may also include other components that are not shown in FIG. 2A. Such other components may be controlled by controller 202 via control setting generator 218 and may be included in the system model defined by the predictive model 204.

For example, the electromagnetic heating control system 200 may include a solvent control system (not shown). The solvent control system can control the pumping or injection of a solvent, such as water, into the hydrocarbon medium 209. Solvent may be injected to increase heat transfer from the load 208 to the hydrocarbon medium 209 and/or increase the flow of hydrocarbons within the hydrocarbon medium 209.

Figure 4:
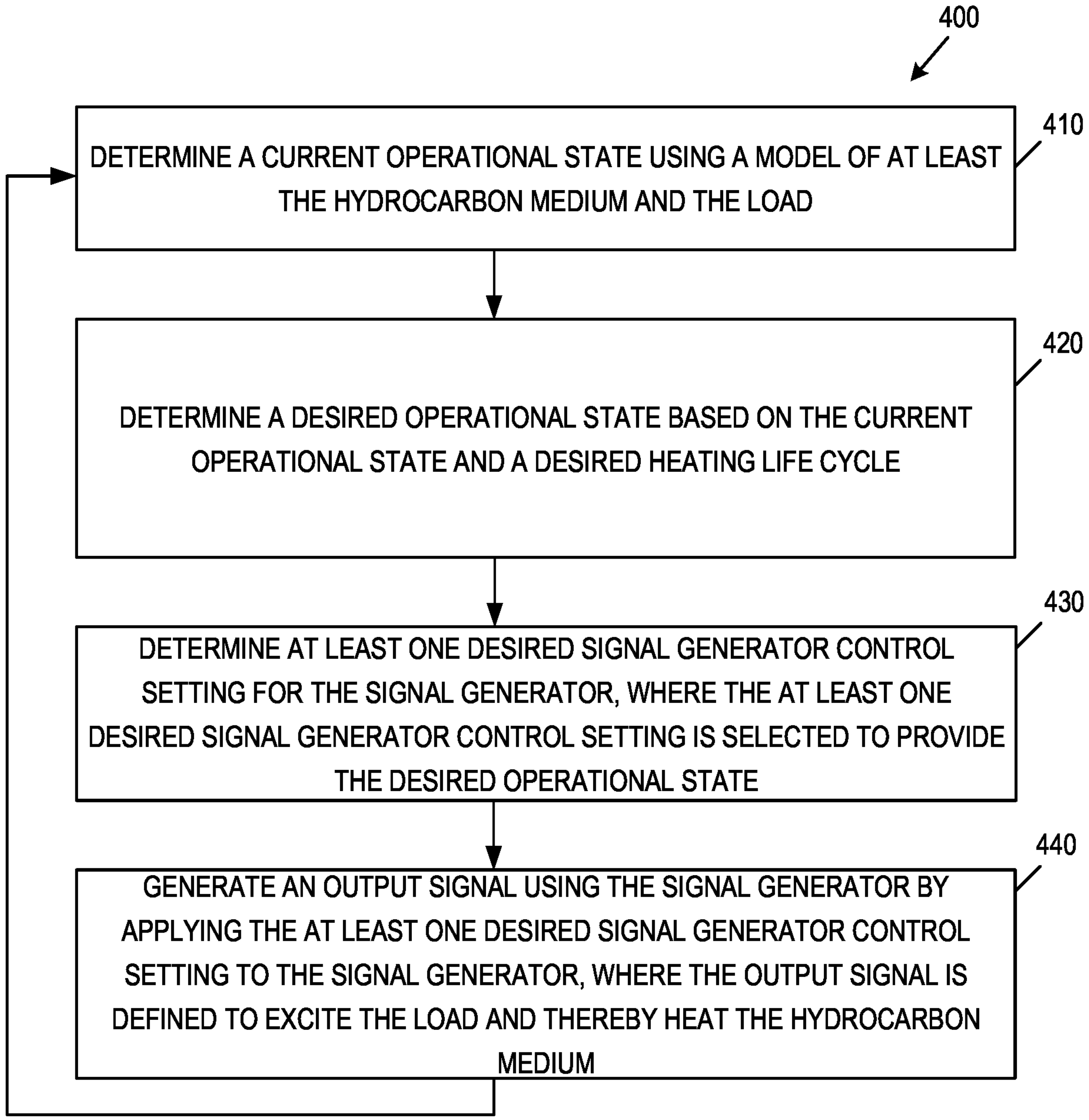
FIG. 4 is a flow chart of an example method for controlling electromagnetic heating of a hydrocarbon medium in accordance with an embodiment.

Referring now to FIG. 4, shown therein is an example method 400 of operating the electromagnetic heating control system 200. Method 400 may be implemented using systems for electromagnetic heating of a hydrocarbon medium such as systems 100 and 200 described herein above.

At 410, the controller 202 can determine a current operational state using a model of at least the hydrocarbon medium and the load. For example, the controller 202 may use the predictive model 204 to determine the current operational state.

As discussed herein above, the predictive model 204 can model various components of the electromagnetic heating control system 200, such as the signal generator 206, the load 208, and the hydrocarbon medium 209.

The current operational state can include various aspects of the electromagnetic heating control system 200 modeled by the predictive model 204. The current operational state can include information related to the present status or condition of properties of the electromagnetic heating control system 200.

For example, the current operational state may include properties related to the hydrocarbon medium 209 such as a temperature profile, a water concentration profile, a hydrocarbon concentration profile, a pressure profile, an electromagnetic profile, etc. Alternately or in addition, the current operational state may include properties related to the load 208 such as a standing electromagnetic wave profile, a temperature profile, etc. Alternately or in addition, the current operational state may include properties related to the signal generator 206 such as an output signal profile, a temperature profile, etc.

The controller 202 may update parameters used by the predictive model 204 in order to determine the current operational state. The controller 202 can update the predictive model 204 by updating the status of one or more of the model parameters.

For example, the status of one or more model parameters may be determined using measured properties of the electromagnetic heating control system 200. For example, sensors 210 can be used to determine the actual status of various properties of the signal generator 206, the load 208, and/or the hydrocarbon medium 209, such as temperature, pressure, water concentration, current, voltage, impedance, and frequency, etc. The controller 202 can receive the measurements from the sensors 210 and update the status of the model parameters to reflect the actual status of those parameters.

In some cases, the sensors 210 may not measure the status of the parameters directly. The status of one or more model parameters may be determined based on at least one observable of the system state. The observables may be used to determine the actual status of one or more properties directly. Alternately, the observables may be used to infer the actual status of one or more properties.

Optionally, the controller 202 may compare the measured properties with predicted properties from the predictive model 204, e.g. using the process illustrated in FIG. 2D. The controller 202 may determine whether the status of the model parameters needs to be updated based on the comparison. If an update of the model parameter is required, the controller 202 can use the measured status to update the model parameter to reflect the actual status as measured by the sensors 210.

In some embodiments, the controller 202 can determine the status of one or more model parameters based on a machine learning model. For example, an artificial neural network may be trained to generate a predicted status of one or more model parameters based on inputs supplied by the controller 202. In some embodiments, the controller 202 can determine a predicted status of one or more model parameters based on historical data. For example, the controller 202 can determine the predicted status of one or more model parameters based on historical data received from the data sources 212.

At 420, the controller 202 determines a desired operational state based on the current operational state and a desired heating life cycle. The desired heating life cycle can define a heating profile for the load 209. The heating profile defined by the desired heating life cycle may vary with time, e.g. based on the stage of heating of medium 209. The desired heating life cycle may be defined, for example, by a life cycle sub-unit 230 as described herein above. The desired heating life cycle can include information related to a status or condition of the electromagnetic heating control system 200.

Similarly, the desired operational state can include information related to a status or condition of the electromagnetic heating control system 200. However, in contrast to the current operational state, the desired operational state can define a desired status or condition that the controller 202 wishes to achieve at a future time. For example, the desired operational state may include at least one of a specified spatial heating profile along a length of the load, a specified power spectral density of the output signal, and a specified standing electromagnetic wave pattern along a length of the load.

The desired operational state may be determined based on the desired heating life cycle for the medium 209. The desired operational state can be selected for a future time in order to maximize the fit between the desired operational state and a desired state of the desired heating life cycle at the future time. That is, the desired status or condition defined by the desired operational state may be selected to provide a match, or near match, to the status or condition defined by the desired heating life cycle for the future time.

The desired operational state may be modeled by the predictive model 204. For example, each desired operational state may include a particular spatial heating profile along a length of the load 208, a particular standing electromagnetic wave pattern along a length of the load 208, and/or a particular power spectral density of the output signal generated by signal generator 206. These state characteristics defined by each potential operational state can be compared to the corresponding characteristics defined by the desired heating life cycle for the same future time in order to identify the desired operational state.

An example characteristic of a state characteristic defined by the desired heating life cycle may include a uniform heating profile. A uniform heating profile may be desirable to encourage level hydrocarbon production across the hydrocarbon medium 209.

Another example characteristic of a state characteristic defined by the desired heating life cycle may include a targeted heating profile. A targeted heating profile may focus heat to regions that have a high concentration of hydrocarbons and minimize heating in areas that have a low concentration of hydrocarbons. This may promote more efficient heating, by reducing the energy consumption in regions having a low concentration of hydrocarbons. The targeted heating profile defined by the desired heating life cycle may vary depending on the stage of the heating life cycle of the medium 209.

Another example characteristic of a state characteristic defined by the desired heating life cycle may include maintaining a particular water concentration. The particular water concentration defined by the desired heating life cycle may vary depending on the stage of the heating life cycle of the medium 209.

Another example characteristic of a state characteristic defined by the desired heating life cycle may include minimizing the likelihood of electrical arcing. For example, the desired heating life cycle may require a standing wave pattern that does not include regions of excessive voltage. This may help minimize electrical arcing and thus help reduce the risk of damage to equipment.

Another example characteristic of a state characteristic defined by the desired heating life cycle may include a desired arcing condition. In some cases, it may be desirable to cause electrical arcing in order to generate high frequency (relative to the frequency of the output signal) electromagnetic waves. The high frequency electromagnetic waves may travel further distances than the standing electromagnetic waves and accordingly heat regions of the hydrocarbon medium 209 that are located further from the load 208. The electrical arcing can cause high temperatures resulting in pyrolysis of the hydrocarbons within the hydrocarbon medium 209. The processed hydrocarbons may have smaller chains that can more easily be transported. The electrical arcing can also generate hydrogen by breaking down water, which can aid in pyrolysis.

The controller 202 can determine the desired operational state by evaluating the expected operational cost of one or more potential operational states, for example as described above in relation to FIG. 2E. The desired operational state may be selected from the possible operational states in order to minimize the expected operational cost.

For example, the controller 202 may attempt to minimize an operational cost function. An operational cost function can include a plurality of costs associated with a plurality of potential operational states. Each cost can correspond to a penalty or loss associated with a particular potential operational state. Generally, a higher cost can correspond to a less desirable operational state, whereas a lower cost can correspond to a more desirable operation state.

The expected operational cost of a potential operational state may be determined based on cost factors such as the energy loss during heating of the hydrocarbon medium. Energy loss during heating of the hydrocarbon medium may be determined as the difference between input energy supplied to the signal generator and heat energy supplied to the hydrocarbon medium.

The expected operational cost of the potential operational state may also be constrained by at least one operational constraint for the signal generator. For example, the signal generator may have one or more operational constraints such as a voltage range, a current range, a frequency range, a temperature range, a maximum heating and production completion time, and a minimum power, possible generator switch states and so forth.

For example, the controller 202 may determine a plurality of potential operational states using the predictive model 204. Each potential operational state can be modeled by the predictive model 204 using different values for the modeling parameters. Each potential operational state can correspond to a different status or condition of the electromagnetic heating control system 200. The controller 202 may then evaluate the expected operational costs associated with each potential operational state, and assign the determined cost to each potential operational state. The controller 202 can then select the potential operational state associated with the lowest total cost as the desired operational state. The controller 202 may be configured to limit the potential operational states to only those in which the generator 206 is capable of operating (e.g. based on the generator operational constraints).

The various potential operational states may correspond to different heating profiles, standing electromagnetic waves, or output signals. The potential operational states may correspond to different configurations of the various components of the electromagnetic heating control system 200. For example, each potential operational state may correspond to a different configuration of the signal generator 206 (a different set of signal generator control settings). Multiple configurations of the signal generator 206 (i.e. set of signal generator control settings) may result in the same or very similar output signal or output impedance. However, different signal generator control settings may require different energy inputs or result in different energy losses, thus affecting the expected operational cost.

The expected operational cost may incorporate different types of costs for the potential operational states. For example, the cost function may include costs related to energy loss during heating of the hydrocarbon medium 209 (i.e., the difference between input energy supplied to the signal generator 206 and heat energy supplied to the hydrocarbon medium 209). The cost function may also include costs corresponding to the efficacy of hydrocarbon extraction (i.e., the residual amount of hydrocarbon that would remain in the hydrocarbon medium 209).

The controller 202 can also minimize the cost function in accordance with one or more constraints. Accordingly, the minimization of the cost function may be referred to as a constrained optimization.

The constraints may include hard constraints and/or soft constraints. A hard constraint may limit the potential operating states evaluated by the controller 202. That is, the controller 202 may not select a potential operational state that fails to satisfy a hard constraint (such as a generator operational constraint). A soft constraint may add an additional cost or penalty to particular operation state.

The constraints may be related to operating ranges of the components of the electromagnetic heating control system 200. For example, for the signal generator 206, the constraints may include a voltage range, a current range, a frequency range, and/or a temperature range over which the signal generator 206 is operational (or is effectively operational). The constraints may be related to the maximum capability of a component or a maximum safety rating. For example, the constraints may be selected to prevent electrical arcing and/or damage to equipment.

Alternately or in addition, the constraints may be related to the efficiency of the electromagnetic heating control system 200. For example, the constraints may include a maximum completion time for hydrocarbon extraction, a minimum power, a maximum energy expenditure, or a maximum financial cost.

Alternately or in addition, the constraints may be related to a required heating profile. The heating profile may limit heating in specific regions to prevent overheating and equipment damage. The heating profile may be required to ensure efficient hydrocarbon production.

The controller 202 can minimize the cost function using various different types of evaluation algorithms and methods. There may be a large possible number of potential operating states—for example, there may be upwards of $2^{116}$ possible potential operating states in some cases. Accordingly, some of the possible potential operating states may be eliminated using a rules based algorithm. The controller 202 may use a genetic algorithm to evaluate the expected operational cost of the potential operating states.

It should be noted that the minimization of a cost function described herein need not refer to a global minimum. For example, where there are a large number of possible potential operational states, minimizing the cost function may refer to a local minimum within a selected range of potential operational states.

At 430, the controller 202 determines one or more desired control settings for the signal generator 206 to achieve the desired operational state. For example, the desired control settings for the signal generator 206 may include a voltage setting, a current setting, a frequency setting, a sequence of state transitions etc.

The controller 202 can determine the desired control settings in a variety of ways. In some embodiments, the controller 202 can determine the desired control settings based on a machine learning model. For example, an artificial neural network may be trained to determine the desired control settings based on inputs supplied by the controller 202, such as predictions from the predictive model 204 of the desired operating state. Alternately or in addition, the controller 202 may determine the desired control settings using historical configuration data. For example, the controller 202 can determine the desired control settings based on historical data received from the data sources 212. FIG. 2E illustrates an example iterative process for determining desired control settings.

For example, for a desired spatial heating profile, the controller 202 may determine a particular standing wave pattern that can achieve a desired spatial heating profile. The controller 202 may then determine a particular power spectral density for an output signal that, when applied to the load 208, can generate the particular standing wave pattern. The controller 202 can then determine control settings for the signal generator 206 to generate an output signal having the particular power spectral density.

The controller 202 may also determine one or more desired control settings for other components of the electromagnetic heating control system 200 to achieve the desired operational state. For example, the controller 202 may determine one or more desired control settings for the load 208. In another example, the controller 202 may determine one or more desired control setting for a solvent control system (not shown). The solvent control unit may be configured to provide a solvent to the hydrocarbon medium 209.

At 440, the controller 202 can apply the one or more desired control settings to the signal generator 206. The signal generator 206 can then generate an output signal. The output signal can then excite the load 208, thereby heating the hydrocarbon medium 209. This may facilitate extraction of hydrocarbons from the hydrocarbon medium.

Alternatively or in addition, controller 202 may also apply any desired load control setting(s) to the load 208. Alternatively or in addition, controller 202 may also apply any desired solvent control setting to a solvent control unit.

Figure 7:
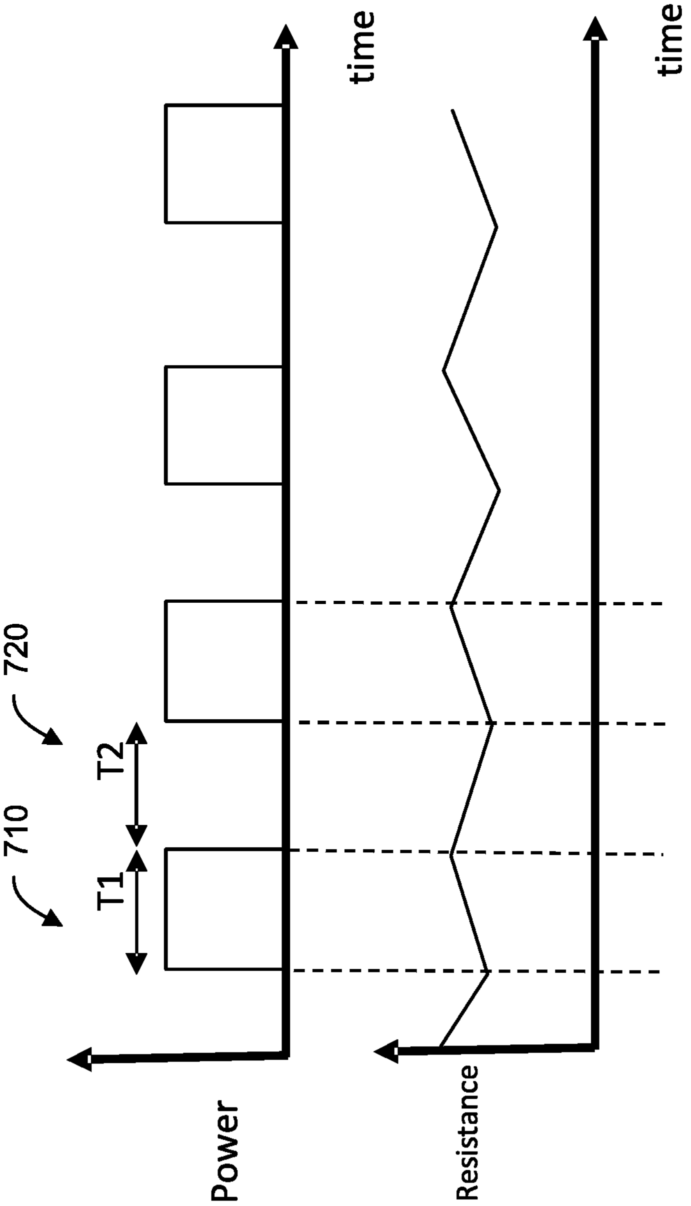
FIG. 7 is a graph illustrating an example output signal in accordance with an embodiment.

In some embodiments, the desired control settings can cause the signal generator 206 to generate a pulsed output signal. For example, reference is now made to FIG. 7, which illustrates an example plot of a pulsed output signal. As shown in FIG. 7, the signal generator 206 can be repeatedly turned on for a dwell time of T1 and turned off for dwell time of T2.

As shown in the example of FIG. 7, the resultant output signal can have a first dwell state 710 having a non-zero amplitude during T1 and a second dwell state 720 having a zero amplitude during T2. During the active dwell time T1, water may diffuse away from the load 208 as the region of the hydrocarbon medium 209 around the load 208 is heated. Accordingly, the resistance of the region can increase during T1. During the inactive dwell time T2, water may diffuse back toward the load 208, increasing the resistance of the region of the hydrocarbon medium 209.

As illustrated in the example of FIG. 7, pulsing the output signal may allow the resistance of the hydrocarbon medium 209 to be maintained within a specific range. The pulsed output signals may thus be used to control the impedance of the load 208.

The length of each of T1 and T2 may be determined based on diffusion properties of the hydrocarbon medium 209. The diffusion properties of the hydrocarbon medium 209 may, in turn, be determined using sensors 210, for example using the methods described with respect to FIGS. 6A-B and/or using predictive model 204.

Referring again to FIG. 4, the controller 202 may, in some embodiments, apply one or more desired control settings to other components of the electromagnetic heating control system 200. For example, the controller may apply desired control settings to the load 208 or the solvent control system (not shown).

Optionally, the method 400 can be repeated or looped as shown in FIG. 4. That is, following the completion of step 440, method 400 may repeat again beginning back at step 410. The electromagnetic heating control system 200 may repeat the process illustrated in FIG. 4 to operate in a live or continuous manner.

For example, the electromagnetic heating control system 200 may reconfigure various aspects of the system 200 in response to changing conditions in the hydrocarbon medium 209 (e.g. as shown in FIG. 2D). The predictive model 204 can be updated to reflect the actual status and/or updated predicted status of the model parameters and new control settings can be generated.

The electromagnetic heating control system 200 may also be used in some cases where the system 200 does not heat the hydrocarbon medium 209 directly. For example, the electromagnetic heating control system 200 may be implemented with a SAGD system. In the SAGD system, injected steam is used to heat the hydrocarbon medium 209 instead of the electromagnetic waves. In such implementations, the load 208 may not be used to heat the hydrocarbon medium 209 directly. Rather, the load 208 may be used to generate probe signals to measure various properties of the steam injection.

As used herein, reference to the load may be understood to include the electrical load of the radiating structure (e.g. conductors 112, radiating structures 208 etc.) immersed within the hydrocarbon medium and any electrical connection apparatus (e.g. waveguide portion 110, coupling member 207) to the generator (e.g. generators 108/206).

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A system for controlling electromagnetic heating of a hydrocarbon medium using a signal generator and a load having a frequency dependent and time dependent and amplitude dependent impedance, the system comprising:
- a processor configured to:
  - determine a desired heating life cycle for the hydrocarbon medium;
  - determine a current operational state, using a model of at least the hydrocarbon medium and the load;
  - determine a desired operational state based on the current operational state and the desired heating life cycle, wherein the desired operational state is selected to maximize a fit between the desired operational state and the desired heating life cycle;
  - determine at least one desired signal generator control setting for the signal generator, wherein the at least one desired signal generator control setting is selected to provide the desired operational state; and
  - apply the at least one desired signal generator control setting to the signal generator, wherein the signal generator generates an output signal in response to the applied at least one desired signal generator control setting, and wherein the output signal is defined to excite the load and thereby heat the hydrocarbon medium.

2. The system of claim 1, wherein the processor is configured to:
- determine the desired heating life cycle to include a heating profile for the load, wherein the heating profile varies with time;
- determine the current operational state for a present time; and
- select the desired operational state for a future time to maximize the fit between the desired operational state and a desired state of the desired heating life cycle at the future time.

3. The system of claim 2, wherein the processor is configured to determine the desired operational state by:
- determining a plurality of potential operational states based on the model;
- determining a plurality of potential cost penalties by, for each potential operational state in the plurality of potential operational states determining a potential cost penalty associated that potential operational state using the desired heating life cycle;
- determining a minimum cost operational state of the plurality of potential operational states, the minimum cost operational state associated with a lowest cost penalty of the plurality of cost penalties; and
- identifying the minimum cost operational state as the desired operational state.

4. The system of claim 1, wherein the processor is configured to:
- determine the current operational state for a present time;
- determine a difference between the current operational state for the present time and the desired heating life cycle for the present time; and
- update the desired heating life cycle using the difference.

5. The system of claim 1, wherein the load comprises at least one radiating structure positioned in the hydrocarbon medium, and when the load is excited by the output signal, electromagnetic energy is coupled into the hydrocarbon medium by the load.

6. The system of claim 1, wherein:

the at least one desired signal generator control setting defines a sequence of state transitions;

the processor is configured to apply the at least one desired signal generator control setting to the signal generator by adjusting the signal generator between a plurality of signal generator states according to the sequence of state transitions; and the sequence of state transitions are defined to provide a desired waveform for the output signal.

7. The system of claim 1, wherein the model comprises at least one model parameter and the processor is configured to determine the current operational state by:

determining a status of the at least one model parameter;

generating an updated model by updating the model using the status of the at least one model parameter; and determining the current operational state from the updated model.

8. The system of claim 7, wherein each model parameter in the at least one model parameter comprises an expected status of one or more properties of at least one of the signal generator, the load, and the hydrocarbon medium, wherein the one or more properties comprises at least one of temperature, pressure, water concentration, current, voltage, impedance, and frequency; and the system further comprises:

at least one sensor operable to measure an actual status of the one or more properties of at least one of the signal generator, the load, and the hydrocarbon medium; and wherein determining the status of the at least one model parameter comprises:

for a given model parameter in the at least one model parameter:

determining, using the at least one sensor, the actual status of the one or more properties of at least one of the signal generator, the load, and the hydrocarbon medium corresponding to that given model parameter; and updating the expected status to correspond to the actual status.

9. The system of claim 8, wherein determining the actual status of the one or more properties comprises:

applying at least one sensing signal to the load;

measuring at least one reflected sensing signal from the load; and determining the actual status of the one or more properties using the at least one reflected sensing signal.

10. The system of claim 9, wherein determining the actual status of the one or more properties comprises:

prior to applying the at least one sensing signal to the load, applying an output signal from the signal generator to the load.

11. The system of claim 9, wherein determining the actual status of the one or more properties comprises:

prior to applying the at least one sensing signal to the load, disabling an output signal from the signal generator to the load.

12. The system of claim 9, wherein the at least one sensing signal comprises at least two sensing signals, each of the at least two sensing signals being orthogonal with respect to the other sensing signals.

13. The system of claim 7, wherein the processor is configured to determine the status of the at least one model parameter based on at least one of historical data and a machine learning model.

14. The system of claim 1, wherein the model comprises at least one of an electromagnetic property, a thermal property, a fluid property, and a structural property.

15. The system of claim 1, wherein the model comprises a transverse electromagnetic mode forming a standing wave along a length of the load.

16. The system of claim 1, wherein the desired operational state is determined based on at least one constraint for the signal generator, and the at least one constraint for the signal generator comprises at least one of a voltage range, a current range, a frequency range, a temperature range, a maximum completion time, a minimum power, and a maximum power.

17. The system of claim 1, wherein the desired operational state comprises at least one of a spatial heating profile along a length of the load, a power spectral density of the output signal, and a standing electromagnetic wave pattern along a length of the load.

18. The system of claim 1, wherein the desired operational state comprises at least one arcing condition.

19. The system of claim 1, wherein the processor is further configured to determine the at least one desired signal generator control setting based on at least one of historical data and a machine learning model.

20. The system of claim 1, wherein the processor is further configured to:

determine at least one desired load control setting for the load based on the desired operational state; and apply the at least one desired load control setting to the load.

21. The system of claim 1, wherein the processor is further configured to:

determine at least one desired solvent control setting for a solvent control unit based on the desired operational state, the solvent control unit for providing solvent to the hydrocarbon medium; and apply the at least one desired solvent control setting to the solvent control unit.

* * * * *